US011321868B1

(12) United States Patent
Akbas et al.

(10) Patent No.: US 11,321,868 B1
(45) Date of Patent: *May 3, 2022

(54) SYSTEM FOR ESTIMATING A POSE OF ONE OR MORE PERSONS IN A SCENE

(71) Applicant: Bertec Corporation, Columbus, OH (US)

(72) Inventors: Emre Akbas, Ankara (TR); Muhammed Kocabas, Ankara (TR); Muhammed Salih Karagoz, Ankara (TR); Necip Berme, Worthington, OH (US)

(73) Assignee: Bertec Corporation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,416

(22) Filed: Jul. 26, 2021

Related U.S. Application Data

(63) Continuation of application No. 16/441,968, filed on Jun. 14, 2019, now Pat. No. 11,074,711.
(Continued)

(51) Int. Cl.
G06T 7/73 (2017.01)
G06K 9/00 (2006.01)
(Continued)

(52) U.S. Cl.
CPC ............ G06T 7/73 (2017.01); G06K 9/00362 (2013.01); G06K 9/46 (2013.01); G06K 9/6217 (2013.01);
(Continued)

(58) Field of Classification Search
CPC ............ G06T 7/73; G06T 2207/20016; G06T 2207/20084; G06T 2207/20132;
(Continued)

(56) References Cited

U.S. PATENT DOCUMENTS 6,038,488 A 3/2000 Barnes et al.
6,113,237 A 9/2000 Ober et al.
(Continued)

OTHER PUBLICATIONS

Wang et al., "Combined Top-Down/Bottom-Up Human Articulated Pose Estimation Using AdaBoost Learning", Aug. 2010, IEEE, 2010 20th International Conference on Pattern Recognition, p. 3670-3673 (Year: 2010).*
(Continued)

Primary Examiner — Vincent Rudolph
Assistant Examiner — Timothy Choi
(74) Attorney, Agent, or Firm — The Law Office of Patrick F. O'Reilly III, LLC

(57) ABSTRACT

A system for estimating a pose of one or more persons in a scene includes a camera configured to capture an image of the scene; and a data processor configured to execute computer executable instructions for: (i) receiving the image of the scene from the camera; (ii) extracting features from the image of the scene for providing inputs to a keypoint subnet and a person detection subnet; (iii) generating one or more keypoints using the keypoint subnet; (iv) generating one or more person instances using the person detection subnet; (v) assigning the one or more keypoints to the one or more person instances by learning pose structures from the image data; and (vi) determining one or more poses of the one or more persons in the scene using the assignment of the one or more keypoints to the one or more person instances.

18 Claims, 15 Drawing Sheets

Related U.S. Application Data

(60) Provisional application No. 62/685,780, filed on Jun. 15, 2018.

(51) Int. Cl.
*G06K 9/46* (2006.01)
*G06K 9/62* (2006.01)
*G06N 3/04* (2006.01)
*H04N 5/247* (2006.01)

(52) U.S. Cl.
CPC ....... *G06N 3/0454* (2013.01); *G06K 2209/21* (2013.01); *G06T 2207/20016* (2013.01); *G06T 2207/20084* (2013.01); *G06T 2207/20132* (2013.01); *G06T 2207/30196* (2013.01); *H04N 5/247* (2013.01)

(58) Field of Classification Search
CPC ...... G06T 2207/30196; G06K 9/00362; G06K 9/46; G06K 9/6217; G06K 2209/21; G06N 3/0454; H04N 5/247
See application file for complete search history.

(56) References Cited

U.S. PATENT DOCUMENTS

| | | |
|---|---|---|
| 6,152,564 A | 11/2000 | Ober et al. |
| 6,295,878 B1 | 10/2001 | Berme |
| 6,354,155 B1 | 3/2002 | Berme |
| 6,389,883 B1 | 5/2002 | Berme et al. |
| 6,936,016 B2 | 8/2005 | Berme et al. |
| 8,181,541 B2 | 5/2012 | Berme |
| 8,315,822 B2 | 11/2012 | Berme et al. |
| 8,315,823 B2 | 11/2012 | Berme et al. |
| D689,388 S | 9/2013 | Berme |
| D689,389 S | 9/2013 | Berme |
| 8,543,540 B1 | 9/2013 | Wilson et al. |
| 8,544,347 B1 | 10/2013 | Berme |
| 8,643,669 B1 | 2/2014 | Wilson et al. |
| 8,700,569 B1 | 4/2014 | Wilson et al. |
| 8,704,855 B1 | 4/2014 | Berme et al. |
| 8,764,532 B1 | 7/2014 | Berme |
| 8,847,989 B1 | 9/2014 | Berme et al. |
| D715,669 S | 10/2014 | Berme |
| 8,902,249 B1 | 12/2014 | Wilson et al. |
| 8,915,149 B1 | 12/2014 | Berme |
| 9,032,817 B2 | 5/2015 | Berme et al. |
| 9,043,278 B1 | 5/2015 | Wilson et al. |
| 9,066,667 B1 | 6/2015 | Berme et al. |
| 9,081,436 B1 | 7/2015 | Berme et al. |
| 9,168,420 B1 | 10/2015 | Berme et al. |
| 9,173,596 B1 | 11/2015 | Berme et al. |
| 9,200,897 B1 | 12/2015 | Wilson et al. |
| 9,277,857 B1 | 3/2016 | Berme et al. |
| D755,067 S | 5/2016 | Berme et al. |
| 9,404,823 B1 | 8/2016 | Berme et al. |
| 9,414,784 B1 | 8/2016 | Berme et al. |
| 9,468,370 B1 | 10/2016 | Shearer |
| 9,517,008 B1 | 12/2016 | Berme et al. |
| 9,526,443 B1 | 12/2016 | Berme et al. |
| 9,526,451 B1 | 12/2016 | Berme |
| 9,558,399 B1 | 1/2017 | Jeka et al. |
| 9,568,382 B1 | 2/2017 | Berme et al. |
| 9,622,686 B1 | 4/2017 | Berme et al. |
| 9,763,604 B1 | 9/2017 | Berme et al. |
| 9,770,203 B1 | 9/2017 | Berme et al. |
| 9,778,119 B2 | 10/2017 | Berme et al. |
| 9,814,430 B1 | 11/2017 | Berme et al. |
| 9,829,311 B1 | 11/2017 | Wilson et al. |
| 9,854,997 B1 | 1/2018 | Berme et al. |
| 9,916,011 B1 | 3/2018 | Berme et al. |
| 9,927,312 B1 | 3/2018 | Berme et al. |
| 10,010,248 B1 | 7/2018 | Shearer |
| 10,010,286 B1 | 7/2018 | Berme et al. |
| 10,085,676 B1 | 10/2018 | Berme et al. |
| 10,117,602 B1 | 11/2018 | Berme et al. |
| 10,126,186 B2 | 11/2018 | Berme et al. |
| 10,216,262 B1 | 2/2019 | Berme et al. |
| 10,231,662 B1 | 3/2019 | Berme et al. |
| 10,264,964 B1 | 4/2019 | Berme et al. |
| 10,331,324 B1 | 6/2019 | Wilson et al. |
| 10,342,473 B1 | 7/2019 | Berme et al. |
| 10,390,736 B1 | 8/2019 | Berme et al. |
| 10,413,230 B1 | 9/2019 | Berme et al. |
| 10,463,250 B1 | 11/2019 | Berme et al. |
| 10,527,508 B2 | 1/2020 | Berme et al. |
| 10,555,688 B1 | 2/2020 | Berme et al. |
| 10,646,153 B1 | 5/2020 | Berme et al. |
| 10,722,114 B1 | 7/2020 | Berme et al. |
| 10,736,545 B1 | 8/2020 | Berme et al. |
| 10,765,936 B2 | 9/2020 | Berme et al. |
| 10,803,990 B1 | 10/2020 | Wilson et al. |
| 10,853,970 B1 | 12/2020 | Akbas et al. |
| 10,856,796 B1 | 12/2020 | Berme et al. |
| 10,860,843 B1 | 12/2020 | Berme et al. |
| 10,945,599 B1 | 3/2021 | Berme et al. |
| 10,966,606 B1 | 4/2021 | Berme |
| 11,033,453 B1 | 6/2021 | Berme et al. |
| 11,052,288 B1 | 7/2021 | Berme et al. |
| 11,054,325 B2 | 7/2021 | Berme et al. |
| 11,074,711 B1 * | 7/2021 | Akbas ............... G06K 9/00362 |
| 2003/0216656 A1 | 11/2003 | Berme et al. |
| 2008/0228110 A1 | 9/2008 | Berme |
| 2011/0277562 A1 | 11/2011 | Berme |
| 2012/0266648 A1 | 10/2012 | Berme et al. |
| 2012/0271565 A1 | 10/2012 | Berme et al. |
| 2015/0096387 A1 | 4/2015 | Berme et al. |
| 2016/0245711 A1 | 8/2016 | Berme et al. |
| 2016/0334288 A1 | 11/2016 | Berme et al. |
| 2018/0024015 A1 | 1/2018 | Berme et al. |
| 2019/0078951 A1 | 3/2019 | Berme et al. |
| 2019/0156210 A1 | 5/2019 | He et al. |
| 2019/0171870 A1 * | 6/2019 | Vajda ....................... G06T 7/75 |
| 2020/0139229 A1 | 5/2020 | Berme et al. |
| 2020/0408625 A1 | 12/2020 | Berme et al. |

OTHER PUBLICATIONS

Newell et al., "Associative Embedding: End-to-End Learning for Joint Detection and Grouping", Dec. 2017, NIPS'17: Proceedings of the 31st International Conference on Neural Information Processing Systems, p. 1-11. (Year: 2017).*

Pishchulin et al., "DeepCut: Joint Subset Partition and Labeling for Multi Person Pose Estimation", Jun. 2016, IEEE, 2016 IEEE Conference on Computer Vision and Pattern Recognition (CVPR), p. 4929-4937. (Year: 2016).*

Lin, Goyal, et al., "Focal Loss for Dense Object Detection", Oct. 2017, IEEE, 2017 IEEE International Conference on Computer Vision (ICCV), p. 2999-3007. (Year: 2017).*

Lin et al., "Feature Pyramid Networks for Object Detection", Jul. 2017, IEEE, 2017 IEEE Conference on Computer Vision and Pattern Recognition (CVPR), p. 936-944. (Year: 2017).*

Belagiannis et al., "3D Pictorial Structures Revisited: Multiple Human Pose Estimation", Oct. 2016, IEEE, IEEE Transactions on Pattern Analysis and Machine Intelligence, vol. 38, No. 10, p. 1929-1942. (Year: 2016).*

Insafutdinov et al., "ArtTrack: Articulated Multi-person Tracking in the Wild", Jul. 2017, IEEE, 2017 IEEE Conference on Computer Vision and Pattern Recognition (CVPR), p. 1293-1301. (Year: 2017).*

Jabbar et al. "Real-time Driver Drowsiness Detection for Android Application Using Deep Neural Networks Techniques", Apr. 2018, Elsevier, Procedia Computer Science, vol. 130, p. 400-407. (Year: 2018).*

Lin, T.Y., Maire, M., Belongie, S., Hays, J., Perona, P., Ramanan, D., Dollár, P., Zitnick, C.L.: Microsoft COCO: Common objects in context. In: European Conference on Computer Vision. (May 2014) pp. 1-15.

Cao, Z., Simon, T., Wei, S.E., Sheikh, Y.: Realtime Multi-Person 2D Pose Estimation using Part Affinity Fields. In: IEEE Conference on Computer Vision and Pattern Recognition. (Apr. 2017) pp. 1-9.

(56) References Cited

OTHER PUBLICATIONS

Pishchulin, L., Insafutdinov, E., Tang, S., Andres, B., Andriluka, M., Gehler, P., Schiele, B.: DeepCut: Joint Subset Partition and Labeling for Multi Person Pose Estimation. In: IEEE Conference on Computer Vision and Pattern Recognition. (Apr. 2016) pp. 1-15.

Insafutdinov, E., Pishchulin, L., Andres, B., Andriluka, M., Schiele, B.: Deepercut: A deeper, stronger, and faster multi-person pose estimation model. In: European Conference on Computer Vision. (Sep. 2016) pp. 1-22.

Bulat, A., Tzimiropoulos, G.: Human pose estimation via convolutional part heatmap regression. In: European Conference on Computer Vision (Sep. 2016) pp. 1-16.

Iqbal, U., Gall, J.: Multi-person pose estimation with local joint-to-person associations. In: European Conference on Computer Vision Workshops. (Aug. 2016) pp. 1-15.

Ning, G., Zhang, Z., He, Z.: Knowledge-Guided Deep Fractal Neural Networks for Human Pose Estimation. In: IEEE Transactions on Multimedia. (Aug. 2017) pp. 1-13.

Newell, A., Huang, Z., Deng, J.: Associative Embedding: End-to-End Learning for Joint Detection and Grouping. In: Advances in Neural Information Processing. (Jun. 2017) pp. 1-11.

Chen, Y., Wang, Z., Peng, Y., Zhang, Z., Yu, G., Sun, J.: Cascaded Pyramid Network for Multi-Person Pose Estimation. In: arXiv preprint arXiv:1711.07319. (Nov. 2017) pp. 1-10.

Papandreou, G., Zhu, T., Kanazawa, N., Toshev, A., Tompson, J., Bregler, C., Murphy, K.: Towards Accurate Multi-person Pose Estimation in the Wild. In: IEEE Conference on Computer Vision and Pattern Recognition. (Jan. 2017) pp. 1-10.

He, K., Gkioxari, G., Dollar, P., Girshick, R.: Mask R-CNN. In: International Conference on Computer Vision. (Mar. 2017) pp. 1-12.

Fang, H., Xie, S., Tai, Y., Lu, C.: RMPE: Regional Multi-Person Pose Estimation. In: International Conference on Computer Vision. (Apr. 2017) pp. 1-10.

Wei, S.E., Ramakrishna, V., Kanade, T., Sheikh, Y.: Convolutional Pose Machines. In: IEEE Conference on Computer Vision and Pattern Recognition. (Apr. 2016) pp. 1-9.

Newell, A., Yang, K., Deng, J.: Stacked Hourglass Networks for Human Pose Estimation. In: European Conference on Computer Vision. (Jul. 2016) pp. 1-17.

Chou, C.J., Chien, J.T., Chen, H.T.: Self Adversarial Training for Human Pose Estimation. In: arXiv preprint arXiv:1707.02439. (Aug. 2017) pp. 1-14.

Huang, S., Gong, M., Tao, D.: A Coarse-Fine Network for Keypoint Localization. In: International Conference on Computer Vision. (Oct. 2017) pp. 1-10.

Dalal, N., Triggs, B.: Histograms of Oriented Gradients for Human Detection. In: IEEE Conference on Computer Vision and Pattern Recognition. (Jun. 2005) pp. 1-8.

Pishchulin, L., Andriluka, M., Gehler, P., Schiele, B.: Poselet conditioned pictorial structures. In: IEEE Conference on Computer Vision and Pattern Recognition. (Jun. 2013) pp. 588-595.

Yang, Y., Ramanan, D.: Articulated pose estimation with flexible mixtures-of-parts. In: IEEE Transaction on Pattern Analysis and Machine Intelligence. (Jun. 2011) pp. 1385-1392.

Johnson, S., Everingham, M.: Clustered Pose and Nonlinear Appearance Models for Human Pose Estimation. In: British Machine Vision Conference. (Jan. 2010) pp. 1-11.

Andriluka, M., Roth, S., Schiele, B.: Pictorial Structures Revisited: People Detection and Articulated Pose Estimation. In: IEEE Conference on Computer Vision and Pattern Recognition. (Jun. 2009) pp. 1-8.

Dantone, M., Gall, J., Leistner, C., Van Gool, L.: Human Pose Estimation Using Body Parts Dependent Joint Regressors. In: IEEE Conference on Computer Vision and Pattern Recognition. (Jun. 2013) pp. 3041-3048.

Gkioxari, G., Hariharan, B., Girshick, R., Malik, J.: Using k-poselets for detecting people and localizing their keypoints. In: IEEE Conference on Computer Vision and Pattern Recognition. (Jun. 2014) pp. 3582-3589.

Toshev, A., Szegedy, C.: DeepPose: Human Pose Estimation via Deep Neural Networks. In: IEEE Conference on Computer Vision and Pattern Recognition. (Jun. 2014) pp. 1-9.

Tompson, J., Jain, A., LeCun, Y., Bregler, C.: Joint Training of a Convolutional Network and a Graphical Model for Human Pose Estimation. In: Advances in Neural Information Processing. (Jun. 2014) pp. 1-9.

Carreira, J., Agrawal, P., Fragkiadaki, K., Malik, J.: Human Pose Estimation with Iterative Error Feedback. In: IEEE Conference on Computer Vision and Pattern Recognition. (Jun. 2016) pp. 4733-4742.

Chu, X., Yang, W., Ouyang, W., Ma, C., Yuille, A.L., Wang, X.: Multi-Context Attention for Human Pose Estimation. In: EEE Conference on Computer Vision and Pattern Recognition. (Jul. 2017) pp. 1-10.

Lifshitz, I., Fetaya, E., Ullman, S.: Human Pose Estimation using Deep Consensus Voting. In: European Conference on Computer Vision. (Mar. 2016) pp. 246-260.

Belagiannis, V., Zisserman, A.: Recurrent Human Pose Estimation. In: International Conference on Automatic Face and Gesture Recognition. (May 2017) pp. 1-8.

Ramakrishna, V., Munoz, D., Hebert, M., Bagnell, A.J., Sheikh, Y.: Pose machines: Articulated pose estimation via inference machines. In: European Conference on Computer Vision (Jul. 2014) pp. 1-15.

Szegedy, C., Vanhoucke, V., Ioffe, S., Shlens, J., Wojna, Z.: Rethinking the inception architecture for computer vision. In: IEEE Conference on Computer Vision and Pattern Recognition. (Jun. 2016) pp. 2818-2826.

Ladicky, L., Torr, P.H., Zisserman, A.: Human Pose Estimation Using a Joint Pixel-wise and Part-wise Formulation. In: EEE Conference on Computer Vision and Pattern Recognition (Jun. 2013) pp. 1-8.

Gkioxari, G., Arbelaez, P., Bourdev, L., Malik, J.: Articulated pose estimation using discriminative armlet classifiers. In: IEEE Conference on Computer Vision and Pattern Recognition (Jun. 2013) pp. 3342-3349.

Varadarajan, S., Datta, P., Tickoo, O.: A Greedy Part Assignment Algorithm for Realtime Multi-Person 2D Pose Estimation. In: arXiv preprint arXiv:1708.09182. (Aug. 2017) pp. 1-9.

Iqbal, U., Milan, A., Gall, J.: PoseTrack: Joint Multi-Person Pose Estimation and Tracking. In: IEEE Conference on Computer Vision and Pattern Recognition. (Nov. 2016) pp. 1-10.

He, K., Zhang, X., Ren, S., Sun, J.: Deep Residual Learning for Image Recognition. In: IEEE Conference on Computer Vision and Pattern Recognition. (Dec. 2015) pp. 1-12.

Chen, L.C., Papandreou, G., Kokkinos, I., Murphy, K., Yuille, A.L.: DeepLab: Semantic Image Segmentation with Deep Convolutional Nets, Atrous Convolution, and Fully Connected CRFs. In: IEEE Transaction on Pattern Analysis and Machine Intelligence. (May 2017) pp. 1-14.

Xia, F., Wang, P., Yuille, A., Chen, X.: Joint Multi-Person Pose Estimation and Semantic Part Segmentation. In: IEEE Conference on Computer Vision and Pattern Recognition. (Aug. 2017) pp. 1-10.

Lin, T.Y., Dollár, P., Girshick, R., He, K., Hariharan, B., Belongie, S.: Feature Pyramid Networks for Object Detection. In: IEEE Conference on Computer Vision and Pattern Recognition. (Apr. 2017) pp. 1-10.

Kong, T., Yao, A., Chen, Y., Sun, F.: Hypernet: Towards accurate region proposal generation and joint object detection. In: IEEE Conference on Computer Vision and Pattern Recognition (Apr. 2016) pp. 1-9.

Lin, T.Y., Goyal, P., Girshick, R., He, K., Dollár, P.: Focal loss for dense object detection. In: International Conference on Computer Vision. (Aug. 2017) pp. 1-10.

Liu, W., Anguelov, D., Erhan, D., Szegedy, C., Reed, S., Fu, C.Y., Berg, A.C.: SSD: Single shot multibox detector. In: European Conference on Computer Vision. (Dec. 2015) pp. 1-17.

Redmon, J., Divvala, S.K., Girshick, R.B., Farhadi, A.: You Only Look Once: Unified, Real-Time Object Detection. In: IEEE Conference on Computer Vision and Pattern Recognition (Jun. 2016) pp. 1-10.

Girshick, R.: Fast R-CNN. In: International Conference on Computer Vision. (Apr. 2015) pp. 1440-1448.

(56) References Cited

OTHER PUBLICATIONS

Ren, S., He, K., Girshick, R., Sun, J.: Faster R-CNN: Towards real-time object detection with region proposal networks. In: Advances in Neural Information Processing. (Jun. 2015) pp. 1-9.
Abadi, M. et al.: TensorFlow: Large-scale machine learning on heterogeneous systems (Nov. 2015) Software available from tensorflow.org. pp. 1-19.
Chollet, F., et al.: Keras. https://github.com/keras-team/keras (Mar. 2015), pp. 1-5, retrieved from <https://github.com/keras-team/keras> on Jun. 26, 2019.
Gaiser, H., de Vries, M., Williamson, A., Henon, Y., Morariu, M., Lacatusu, V., Liscio, E., Fang, W., Clark, M., Sande, M.V., Kocabas, M.: fizyr/keras-retinanet 0.2. https://github.com/fizyr/keras-retinanet (Mar. 2018), pp. 1-8, retrieved from <https://github.com/fizyr/keras-retinanet> on Jun. 26, 2019.
Deng, J., Dong, W., Socher, R., Li, L.J., Li, K., Fei-Fei, L.: ImageNet: A Large-Scale Hierarchical Image Database. In: IEEE Conference on Computer Vision and Pattern Recognition (Jun. 2009) pp. 1-22.
Kingma, D.P., Ba, J.: Adam: A method for stochastic optimization. In: International Conference on Learning Representations. (May 2015) pp. 1-15.
Bengio, Y., Louradour, J., Collobert, R., Weston, J.: Curriculum learning. In: International Conference on Machine Learning. (Jun. 2009) pp. 1-18.
Everingham, M., Eslami, S.M.A., Van Gool, L., Williams, C.K.I., Winn, J., Zisserman, A.: The pascal visual object classes challenge: A retrospective. In: International Journal of Computer Vision. vol. 111. (Jun. 2014) pp. 98-136.
Ronchi, M.R., Perona, P.: Benchmarking and Error Diagnosis in Multi-Instance Pose Estimation. In: International Conference on Computer Vision. (Jul. 2017) pp. 1-10.
Xie, S., Girshick, R., Dollár, P., Tu, Z., He, K.: Aggregated residual transformations for deep neural networks. In: IEEE Conference on Computer Vision and Pattern Recognition. (Apr. 2017) pp. 1-10.
Chen, L.C., Zhu, Y., Papandreou, G., Schroff, F., Adam, H.: Encoder-Decoder with Atrous Separable Convolution for Semantic Image Segmentation. In: arXiv preprint arXiv:1802.02611. (Feb. 2018) pp. 1-11.
Kendall, A., Badrinarayanan, V., Cipolla, R.: Bayesian segnet: Model uncertainty in deep convolutional encoder-decoder architectures for scene understanding. In: British Machine Vision Conference. (Oct. 2016) pp. 1-11.
Belagiannis et al., "3D Pictorial Structures Revisited: Multiple Human Pose Estimation", Dec. 2015, IEEE, IEEE Transactions on Pattern Analysis and Machine Intelligence, vol. 38, is. 10, p. 1929-1942. (Year: 2015).
Insafutdinov et al., "ArtTrack: Articulated Multi-person Tracking in the Wild", Nov. 2017, IEEE, 2017 IEEE Conference on Computer Vision and Pattern Recognition, p. 1293-1301 (Year: 2017).
Wang et al., "Combined Top-Down/Bottom-Up Human Articulated Pose Estimation Using AdaBoost Learning", Aug. 2010, IEEE, 20th Int. Conf. on Pattern Recognition, p. 3670-3673. (Year: 2010).
Hariharan et al., "Object Instance Segmentation and Fine-Grained Localization Using Hypercolumns", Apr. 2017, IEEE, Transactions on Pattern Analysis and Machine Intelligence, vol. 39, No. 4, p. 627-639 (Year: 2017).
Girshick et al., "Fast R-CNN", Dec. 2015, IEEE, 2015 IEEE Int. Conf. on Computer Vision, p. 1440-1448. (Year: 2015).
"Multilayer perceptron", May 26, 2018, Wikipedia.org, <https://web.archive.org/web/20180526150212/https://en.wikipedia.org/wiki/Multilayer_perceptron>, p. 1-4. (Year: 2018).
First office action on the merits (Non-Final Rejection) in U.S. Appl. No. 16/441,968, dated Nov. 15, 2019.
Second office action on the merits (Final Rejection) in U.S. Appl. No. 16/441,968, dated Mar. 18, 2020.
Third office action on the merits (Non-Final Rejection) in U.S. Appl. No. 16/441,968, dated Jul. 28, 2020.
Fourth office action on the merits (Final Rejection) in U.S. Appl. No. 16/441,968, dated Nov. 27, 2020.
Notice of Allowance in U.S. Appl. No. 16/441,968, dated Mar. 22, 2021.

\* cited by examiner

|    |                    | FPS | AP   | AP₅₀ | AP₇₅ | AP_M | AP_L | AR   | AP₅₀ | AP₇₅ | AP_M | AP_L |
|----|--------------------|-----|------|------|------|------|------|------|------|------|------|------|
| BU | Ours               | 23  | 69.6 | 86.3 | 76.6 | 65.0 | 76.3 | 73.5 | 0.881| 79.5 | 68.6 | 80.3 |
| BU | Newell et al. (ref. [8]) | 6   | 65.5 | 86.8 | 72.3 | 60.6 | 72.6 | 70.2 | 89.5 | 76.0 | 64.6 | 78.1 |
| BU | CMU-Pose (ref. [2])| 10  | 61.8 | 84.9 | 67.5 | 57.1 | 68.2 | 66.5 | 87.2 | 71.8 | 60.6 | 74.6 |
| TD | Megvii (ref. [9])  | -   | 73.0 | 91.7 | 80.9 | 69.5 | 78.1 | 79.0 | 95.1 | 85.9 | 74.8 | 84.6 |
| TD | CFN (ref. [16])    | 3   | 72.6 | 86.7 | 69.7 | 78.3 | 64.1 | -    | -    | -    | -    | -    |
| TD | Mask R-CNN (ref. [11]) | 5 | 69.2 | 90.4 | 76.0 | 64.9 | 76.3 | 75.2 | 93.7 | 81.1 | 70.3 | 81.8 |
| TD | SJTU (ref. [12])   | 0.4 | 68.8 | 87.5 | 75.9 | 64.6 | 75.1 | 73.6 | 91.0 | 79.8 | 68.9 | 80.2 |
| TD | GRMI-2017 (ref. [10]) | - | 66.9 | 86.4 | 73.6 | 64.0 | 72.0 | 71.6 | 89.2 | 77.6 | 66.1 | 79.1 |
| TD | G-RMI-2016 (ref. [10]) | - | 60.5 | 82.2 | 66.2 | 57.6 | 66.6 | 66.2 | 86.6 | 71.4 | 61.9 | 72.2 |

FIG. 13

| Keypoint Models | AP | AP$_{50}$ | AP$_{75}$ | AP$_M$ | AP$_L$ |
|---|---|---|---|---|---|
| R101$_{no\ int.}$ | 61.3 | 83.7 | 69.6 | 56.6 | 67.4 |
| R101$_{no\ concat.}$ | 62.1 | 84.3 | 70.9 | 57.3 | 68.8 |
| R101 | 63.9 | 87.1 | 73.2 | 58.1 | 72.2 |
| R101$_{all}$ | 64.3 | 88.2 | 75 | 59.6 | 73.9 |

FIG. 14

| Backbones | AP | AP$_{50}$ | AP$_{75}$ | AP$_M$ | AP$_L$ |
|---|---|---|---|---|---|
| R50 | 62.3 | 86.2 | 71.9 | 57.7 | 70.4 |
| R101 | 63.9 | 87.1 | 73.2 | 58.1 | 72.2 |
| R101$_{all}$ | 64.3 | 88.2 | 75 | 59.6 | 73.9 |

FIG. 15

| PRN Models | AP | $AP_{50}$ | $AP_{75}$ | $AP_M$ | $AP_L$ |
|---|---|---|---|---|---|
| 1 Layer 50 N | 76.3 | 89.2 | 79.1 | 74.8 | 80.4 |
| 1 Layer 50 N, D | 78.6 | 91.7 | 82.4 | 77.1 | 83.1 |
| 1 Layer 512 N, D | 84.1 | 94.2 | 85.3 | 82 | 86.2 |
| 2 Layers 512 N, D | 81.9 | 91.1 | 82.6 | 79.8 | 84.3 |
| 1 Layer 2048 N, D+R | 83.2 | 95.7 | 86.1 | 82.0 | 86.3 |
| 1 Layer 1024 N, D+R | 89.4 | 97.1 | 91.2 | 87.9 | 91.8 |

FIG. 16

| PRN Ablations | AP | $AP_{50}$ | $AP_{75}$ | $AP_M$ | $AP_L$ |
|---|---|---|---|---|---|
| Both GT | 89.4 | 97.1 | 91.2 | 87.9 | 91.8 |
| GT keypoints + Our bbox | 75.3 | 82.1 | 78 | 70.1 | 84.5 |
| Our keypoints + GT bbox | 65.1 | 89.2 | 76.2 | 60.3 | 74.7 |
| PRN | 64.3 | 88.2 | 75 | 59.6 | 73.9 |
| UCR | 49.7 | 59.5 | 52.4 | 44.1 | 51.6 |
| Max | 45.3 | 55.1 | 48.8 | 40.6 | 46.9 |

FIG. 17

| Models | AP | AP$_{50}$ | AP$_{75}$ | AP$_M$ | AP$_L$ |
|---|---|---|---|---|---|
| Cao et al. (ref. [2]) | 58.4 | 81.5 | 62.6 | 54.4 | 65.1 |
| PRN + (ref. [2]) | 59.2 | 82.2 | 64.4 | 54.1 | 67.0 |
| Newell et al. (ref. [8]) | 56.9 | 80.8 | 61.3 | 49.9 | 68.8 |
| PRN + (ref. [8]) | 58.1 | 81.4 | 63.0 | 51.3 | 68.1 |

FIG. 18

| Person Detectors | AP | AP$_{50}$ | AP$_{75}$ | AP$_S$ | AP$_M$ | AP$_L$ |
|---|---|---|---|---|---|---|
| Ours - R101 | 52.5 | 81.5 | 55.3 | 35.2 | 59 | 71 |
| Ours - R50 | 51.3 | 81.4 | 53.6 | 34.9 | 58 | 68.1 |
| RetinaNet (ref. [41]) | 50.2 | 77.7 | 53.5 | 31.6 | 59 | 71.5 |
| FPN (ref. [39]) | 47.5 | 78 | 50.7 | 28.6 | 55 | 67.4 |

FIG. 19

| Segmentation | IoU |
|---|---|
| DeepLab v3 (ref. [55]) | 92.1 |
| DeepLab v2 (ref. [37]) | 87.4 |
| SegNet (ref. [56]) | 74.9 |
| Ours | 87.8 |

FIG. 20

SYSTEM FOR ESTIMATING A POSE OF ONE OR MORE PERSONS IN A SCENE

CROSS-REFERENCE TO RELATED APPLICATIONS

This is a continuation of U.S. Nonprovisional patent application Ser. No. 16/441,968, entitled "System for Estimating a Pose of One or More Persons in a Scene", filed on Jun. 14, 2019; which claims the benefit of U.S. Provisional Patent Application No. 62/685,780, entitled "System for Estimating a Pose of One or More Persons in a Scene", filed on Jun. 15, 2018, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a pose estimation system. More particularly, the invention relates to a system for estimating two-dimensional (2D) or three-dimensional (3D) poses of one or more persons in a given image.

2. Background

Any solution to the problem of estimating two-dimensional (2D) poses of multiple people in a given image has to address a few sub-problems: detecting body joints (or keypoints, as they are called in the influential Common Object in Context (COCO) dataset—see ref. [1]) such as wrists, ankles, etc., grouping these joints into person instances, or detecting people and assigning joints to person instances. Depending on which sub-problem is addressed first, there have been two major approaches in multi-person 2D estimation, namely bottom-up and top-down. Bottom-up methods (see refs. [2-8]) first detect body joints without having any knowledge as to the number of people or their locations. Next, detected joints are grouped to form individual poses for person instances. On the other hand, top-down methods (see refs. [9-12]) start by detecting people first and then for each person detection, a single-person pose estimation method (e.g., see refs. [13-16]) is executed. Single-person pose estimation, i.e. detecting body joints conditioned on the information that there is a single person in the given input (the top-down approach), is typically a more costly process than grouping the detected joints (the bottom-up approach). Consequently, the top-down methods tend to be slower than the bottom-up methods, since they need to repeat the single-person pose estimation for each person detection; however, they usually yield better accuracy than bottom-up methods.

In order to put the present invention into context, the relevant aspects of the state-of-the-art (SOTA) bottom-up methods (see refs. [2, 8]) will be briefly described. These methods attempt to group detected keypoints by exploiting lower order relations either between the group and keypoints, or among the keypoints themselves. Specifically, Cao et al. (ref. [2]) model pairwise relations (called part affinity fields) between two nearby joints and the grouping is achieved by propagating these pairwise affinities. In the other SOTA method, Newell et al. (see ref. [8]) predict a real number called a tag per detected keypoint, in order to identify the group the detection belongs to. Hence, this model makes use of the unary relations between a certain keypoint and the group it belongs to.

Now, to provide further background for the invention described hereinafter, a brief overview of single person pose estimation and multi-person pose estimation will be provided. Initially, single person pose estimation will be described. Single person pose estimation is used to predict individual body parts given a cropped person image (or, equivalently, given its exact location and scale within an image). Early methods (prior to deep learning) used hand-crafted HOG features (see ref. [17]) to detect body parts and probabilistic graphical models to represent the pose structure (tree-based—refs. [18-21]; non-tree based—refs. [22, 23].

Deep neural networks based models (see refs. [13, 14, 16, 19, 24-29]) have quickly dominated the pose estimation problem after the initial work by Toshev et al., ref. [24] who used the AlexNet architecture to directly regress spatial joint coordinates. Tompson et al., ref. [25] learned pose structure by combining deep features along with graphical models. Carreira et al., ref. [26] proposed the Iterative Error Feedback method to train Convolutional Neural Networks (CNNs) where the input is repeatedly fed to the network along with current predictions in order to refine the predictions. Wei et al., ref. [13] were inspired by the pose machines (see ref. [30]) and used CNNs as feature extractors in pose machines. Hourglass (HG) blocks, developed by Newell et al., ref. [14], are basically convolution-deconvolution structures with residual connections. Newell et al. stacked HG blocks to obtain an iterative refinement process and showed its effectiveness on single person pose estimation. Stacked Hourglass (SHG) based methods made a remarkable performance increase over previous results. Chu et al., ref. [27] proposed adding visual attention units to focus on keypoint regions-of-interest (RoI). Pyramid residual modules by Yang et al., ref. [19] improved the SHG architecture to handle scale variations. Lifshitz et al., ref. [28] used a probabilistic keypoint voting scheme from image locations to obtain agreement maps for each body part. Belagiannis et al., ref. [29] introduced a simple recurrent neural network based prediction refinement architecture. Huang et al., ref. [16] developed a coarse-to-fine model with Inception-v2 (see ref. [31]) network as the backbone. The authors calculated the loss in each level of the network to learn coarser to finer representations of parts.

Next, multi-person pose estimation will be described. Multi-person pose estimation solutions branched out as bottom-up and top-down methods. Bottom-up approaches detect body joints and assign them to people instances, therefore they are faster in test time and smaller in size compared to top-down approaches. However, they miss the opportunity to zoom into the details of each person instance. This creates an accuracy gap between top-down and bottom-up approaches.

In an earlier work by Ladicky et al., ref. [32], they proposed an algorithm to jointly predict human part segmentations and part locations using HOG-based features and probabilistic approach. Gkioxari et al., ref. [33] proposed k-poselets to jointly detect people and keypoints.

Most of the recent approaches use Convolutional Neural Networks (CNNs) to detect body parts and relationships between them in an end-to-end manner (see refs. [2-4, 8, 18, 34]), then use assignment algorithms (see refs. [2-4, 34]) to form individual skeletons.

Pischulin et al., ref. [3] used deep features for joint prediction of part locations and relations between them, then performed correlation clustering. Even though ref. [3] does not use person detections, it is very slow due to the proposed clustering algorithm, and processing time is in the order of hours. In a following work by Insafutdinov et al., ref. [4], they benefit from deeper ResNet architectures as part detectors and improved the parsing efficiency of a previous approach with an incremental optimization strategy. Different from Pischulin and Insafutdinov, Iqbal et al., ref. [35] proposed to solve the densely connected graphical model locally, thus improved time efficiency significantly.

Cao et al., ref. [2] built a model that contained two entangled CPM (ref. [13]) branches to predict keypoint heatmaps and pairwise relationships (part affinity fields) between them. Keypoints are grouped together with a fast Hungarian bipartite matching algorithm according to conformity of part affinity fields between them. This model runs in real-time. Newell et al., ref. [8] extended their SHG idea by outputting associative vector embeddings which can be thought as tags representing each keypoint's group. They group keypoints with similar tags into individual people.

Top-down methods first detect people (typically using a top performing, off-the-shelf object detector) and then run a single person pose estimation (SPPN) method per person to get the final pose predictions. Because a SPPN model is run for each person instance, top-down methods are extremely slow, however, each pose estimator can focus on an instance and perform fine localization. Papandreou et al., ref. [10] used ResNet with dilated convolutions (ref. [36]) which has been very successful in semantic segmentation (ref. [37]) and computing keypoint heatmap and offset outputs. In contrast to Gaussian heatmaps, the authors estimated a disk-shaped keypoint masks and 2-D offset vector fields to accurately localize keypoints. Joint part segmentation and keypoint detection given human detections approach were proposed by Xia et al., ref. [38]. The authors used separate PoseFCN and PartFCN to obtain both part masks and locations and fused them with fully-connected CRFs. This provides more consistent predictions by eliminating irrelevant detections. Fang et al., ref. [12] proposed to use spatial transformer networks to handle inaccurate bounding boxes and used stacked hourglass blocks (ref. [14]). He et al., ref. [11] combined instance segmentation and keypoint prediction in their Mask-RCNN model. They append keypoint heads on top of RoI aligned feature maps to get a one-hot mask for each keypoint. Chen et al., ref. [9] developed globalnet on top of Feature Pyramid Networks (see ref. [39]) for multiscale inference and refined the predictions by using hyper-features (see ref. [40]).

What is needed, therefore, is a pose estimation system that provides a simple, yet effective means for the problem of assigning/grouping body joints to one or more person instances. Moreover, a pose estimation system is needed that operates faster and more efficiently than previous systems. Furthermore, a need exists for a pose estimation system with a network architecture that is extendible to other related problems in image processing, such as person segmentation.

BRIEF SUMMARY OF EMBODIMENTS OF THE INVENTION

Accordingly, the present invention is directed to a system for estimating a pose of one or more persons in a scene (i.e., a pose estimation system) that substantially obviates one or more problems resulting from the limitations and deficiencies of the related art.

In accordance with one or more embodiments of the present invention, there is provided a system for estimating a pose of one or more persons in a scene, the system including a camera, the camera configured to capture an image of the scene; and a data processor including at least one hardware component, the data processor configured to execute computer executable instructions. The computer executable instructions comprising instructions for: (i) receiving the image of the scene from the camera; (ii) extracting features from the image of the scene for providing inputs to a keypoint subnet and a person detection subnet; (iii) generating one or more keypoints using the keypoint subnet; (iv) generating one or more person instances using the person detection subnet; (v) assigning the one or more keypoints to the one or more person instances by learning pose structures from the image data; and (vi) determining one or more poses of the one or more persons in the scene using the assignment of the one or more keypoints to the one or more person instances.

In a further embodiment of the present invention, the data processor is configured to extract the features from the image of the scene using one or more residual networks and one or more feature pyramid networks, which together form a backbone feature extractor for the keypoint and person detection subnets.

In yet a further embodiment, the one or more residual networks utilized by the data processor comprise a plurality of layers, and the one or more feature pyramid networks utilized by the data processor are connected to each of the plurality of layers of the one or more residual networks.

In still a further embodiment, the one or more feature pyramid networks utilized by the data processor comprise first and second feature pyramid networks, each of the first and second feature pyramid networks connected to the plurality of layers of the one or more residual networks; and the data processor is configured to extract the features for the keypoint subnet from the first one of the feature pyramid networks, and the data processor is configured to extract the features for the person detection subnet from the second one of the feature pyramid networks.

In yet a further embodiment, the one or more residual networks utilized by the data processor comprise one or more convolutional neural networks; and, as part of utilizing the first and second feature pyramid networks, the data processor is configured to create pyramid maps with top-down connections from each of the plurality of layers of the one or more residual neural networks feature hierarchy so as to make use of inherent multi-scale representations of a convolutional neural network feature extractor.

In still a further embodiment, the data processor is configured to extract the features from the first and second feature pyramid networks for the respective keypoint and person detection subnets by utilizing a parallel arrangement of the first and second feature pyramid networks.

In yet a further embodiment, the data processor is configured to generate the one or more keypoints using the keypoint subnet by receiving hierarchical convolutional neural network features outputted by the first feature pyramid network as inputs, and then generating keypoint and segmentation heatmaps as outputs.

In still a further embodiment, the keypoint heatmaps generated by the data processor represent keypoint locations as Gaussian peaks.

In yet a further embodiment, the keypoint heatmaps generated by the data processor comprise a plurality of heatmap layers, each of the plurality of heatmap layers corresponding to a particular keypoint class.

In still a further embodiment, the particular keypoint class of the keypoint heatmaps generated by the data processor is selected from a group consisting of an eye, a nose, a wrist, an elbow, a knee, and an ankle.

In yet a further embodiment, the data processor is configured to generate the one or more person instances using the person detection subnet by utilizing a one-stage object detector.

In still a further embodiment, the data processor is configured to generate one or more person detection boxes as a result of executing the person detection subnet.

In yet a further embodiment, the data processor is configured to assign the one or more keypoints to the one or more person instances by implementing a pose residual network.

In still a further embodiment, when implementing the pose residual network, the data processor is configured to crop and resize keypoint heatmaps outputted by the keypoint subnet so as to correspond to person detection boxes generated by the person detection subnet, thus enabling the pose residual network to handle person detections of arbitrary sizes and shapes.

In yet a further embodiment, when implementing the pose residual network, the data processor is further configured to apply a residual correction to the poses processed by the pose residual network.

In still a further embodiment, when implementing the pose residual network, the data processor is further configured to execute a residual multilayer perceptron.

In yet a further embodiment, the one or more poses of the one or more persons in the scene determined by the data processor comprise one or more two-dimensional poses or one or more three-dimensional poses of the one or more persons.

In still a further embodiment, the system further comprises one or more additional cameras configured to capture one or more additional images of the scene from varying perspectives; and the one or more poses of the one or more persons in the scene determined by the data processor comprise one or more three-dimensional poses of the one or more persons.

In yet a further embodiment, the data processor is configured to assign the one or more keypoints to the one or more person instances by additionally considering one or more further images depicting a movement of the one or more persons over a period of time.

It is to be understood that the foregoing summary and the following detailed description of the present invention are merely exemplary and explanatory in nature. As such, the foregoing summary and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 13 illustrates numerical results in tabular form for the COCO test-dev dataset for the pose estimation system described herein (top-down methods are shown separately in the table to make a clear comparison between bottom-up methods);

FIG. 14 illustrates numerical results in tabular form for a comparison of different keypoint models;

FIG. 15 illustrates numerical results in tabular form for the performance of different backbone architectures;

FIG. 16 illustrates numerical results in tabular form for the performance of different PRN models on COCO validation set;

FIG. 17 illustrates numerical results in tabular form for ablation experiments of the PRN with COCO validation data;

FIG. 18 illustrates PRN assignment numerical results in tabular form with non-grouped keypoints obtained from two bottom-up methods;

FIG. 19 illustrates person detection numerical results on the COCO dataset in tabular form;

FIG. 20 illustrates person segmentation results on PASCAL VOC 2012 test split in tabular form.

Throughout the figures, the same parts are always denoted using the same reference characters so that, as a general rule, they will only be described once.

DETAILED DESCRIPTION OF EMBODIMENTS OF THE INVENTION

Figure 1:
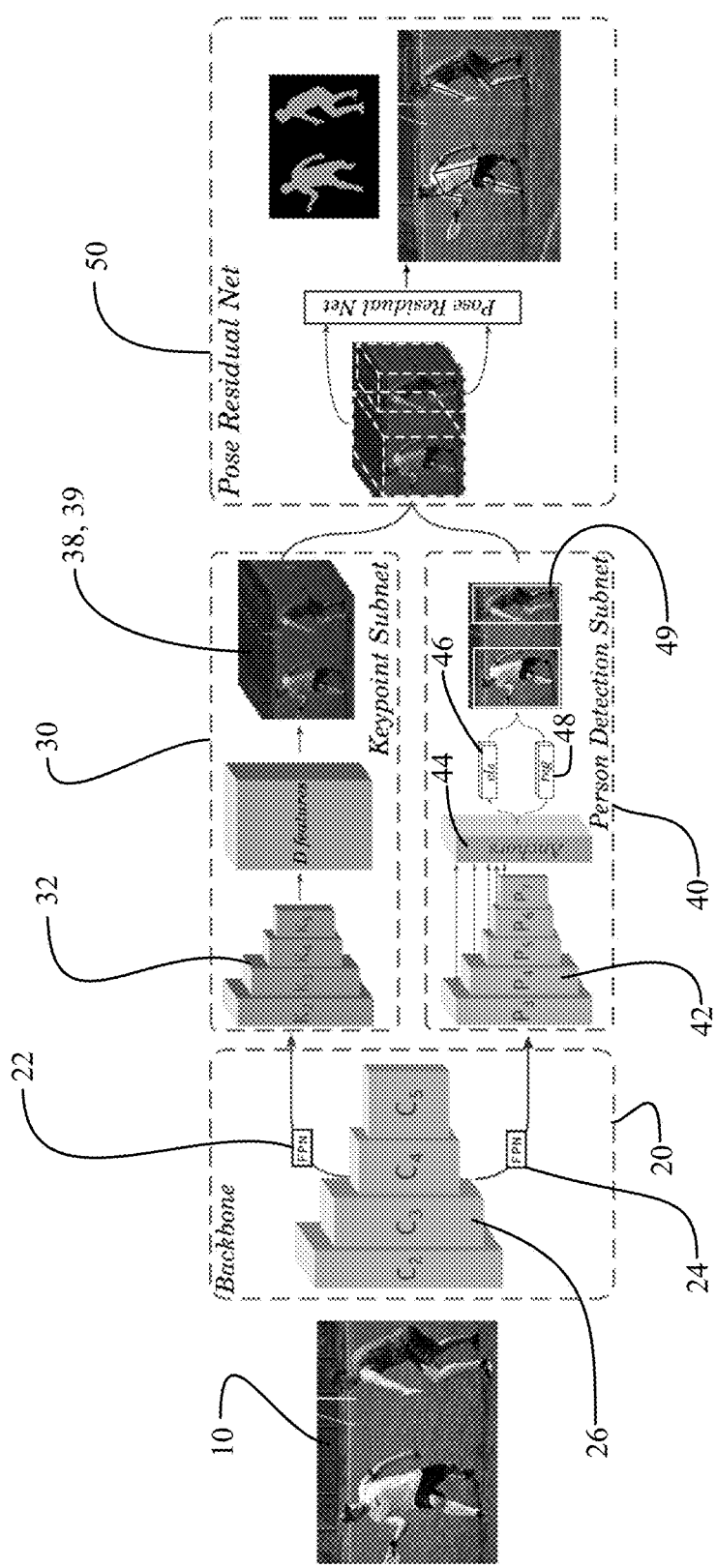
FIG. 1 is a schematic diagram of the multi-task learning architecture used in conjunction with the pose estimation system described herein, according to an illustrative embodiment of the invention.

As will be described hereinafter, a new bottom-up system and method for multi-person two-dimensional (2D) pose estimation is disclosed. In addition, a system utilizing a camera and a data processor for performing multi-person two-dimensional (2D) pose estimation is disclosed herein. The system and method described herein is based on a multi-task learning model which can jointly handle the person detection, keypoint detection, person segmentation and pose estimation problems. With reference to FIG. 1, it can be seen that, in the illustrative embodiment, the system network comprises a shared backbone for feature extraction, detection subnets for keypoint and person detection/segmentation, and a final network which carries out the pose estimation (i.e., assigning detected keypoints to person instances).

Figure 2:
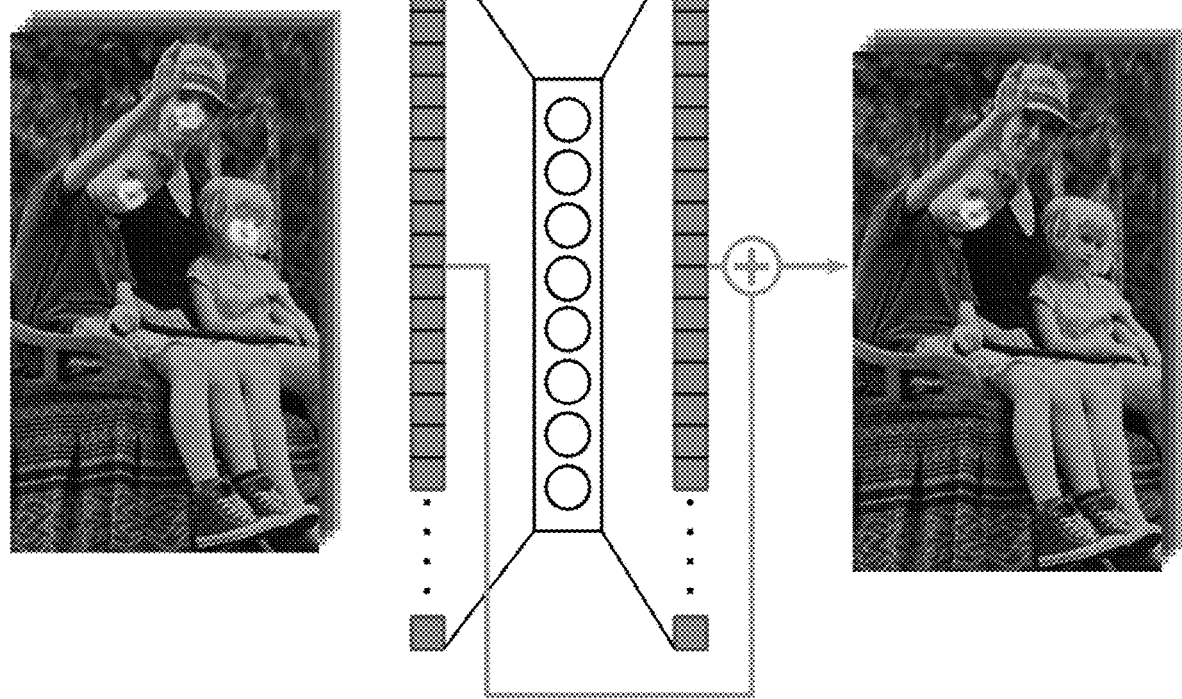
FIG. 2 illustrates an example related to the pose residual network (PRN) that is used in conjunction with the pose estimation system described herein.
Figure 3:
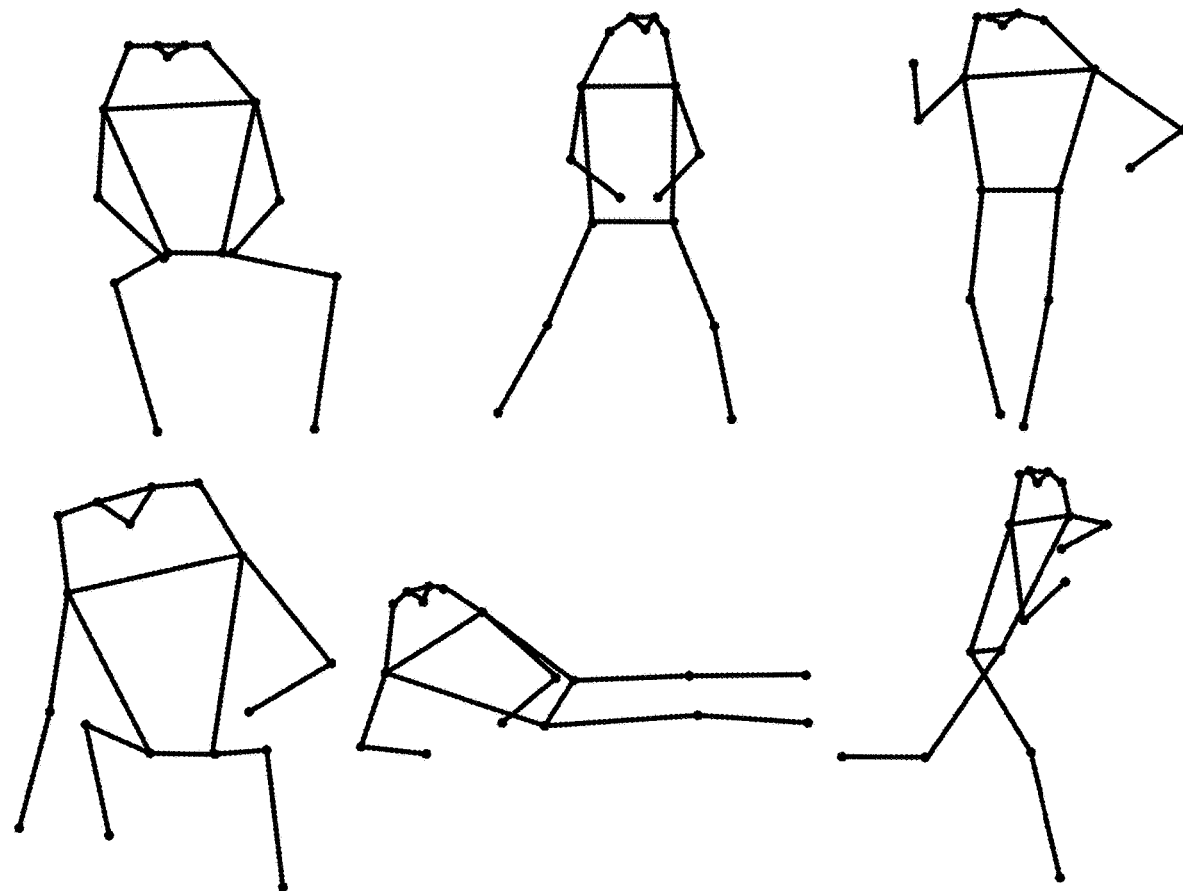
FIG. 3 illustrates examples of six atomic poses obtained via clustering the structures learned by the pose residual network of the pose estimation system described herein.

In the pose estimation step of the illustrative embodiment, the system network implements an innovative assignment method. This system network receives keypoint and person detections, and produces a pose for each detected person by assigning keypoints to person boxes using a learned function. Advantageously, the system and method described herein achieves the grouping of detected keypoints in a single shot by considering all joints together at the same time. This part of the system network, which achieves the grouping, is referred to as the Pose Residual Network (PRN) herein (refer to FIG. 2). The PRN takes a region-of-interest (RoI) pooled keypoint detections and then feeds them into a residual multilayer perceptron (MLP). PRN considers all joints simultaneously and learns configurations of joints. This capability of the PRN is illustrated by plotting a sample set of learned configurations in FIG. 3.

Experiments performed on the Common Objects in Context dataset (i.e., the COCO dataset), using no external data demonstrate that the system described herein outperforms all previous bottom-up systems. In particular, a 4-point mean average precision (mAP) increase over the previous best result was achieved. The system described herein performs on par with the best performing top-down system while being an order of magnitude faster than them. Given the fact that bottom-up systems have always performed less accurately than the top-down systems, the results obtained with the system described herein are indicative of its exceptional characteristics.

Figure 12:
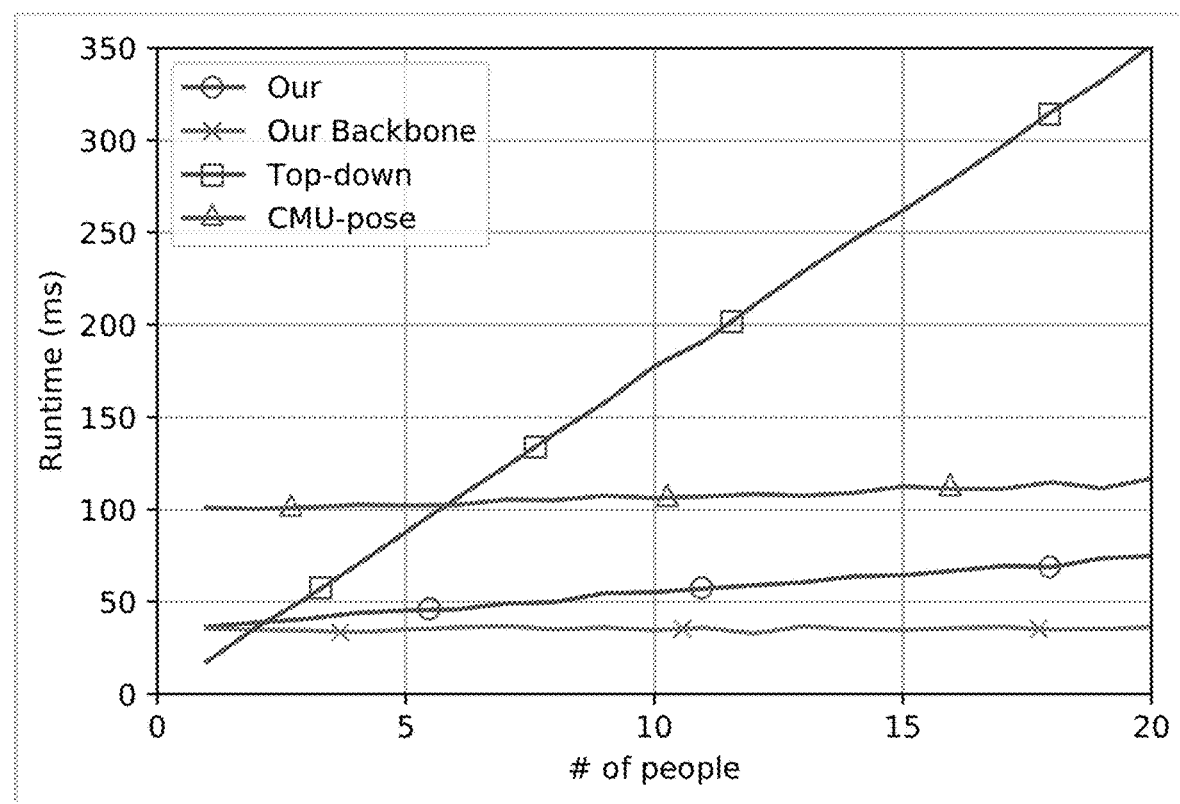
FIG. 12 illustrates graphical results of a runtime analysis of the pose estimation system described herein with respect to number of people.

In terms of running time, the system described herein appears to be the fastest of all multi-person 2D pose estimation systems. Depending on the number of people in the input image, the system runs at between 27 frames per second (FPS) (for one person detection) and 15 FPS (for 20 person detections). For a typical COCO image, which contains approximately three people on average, approximately 23 FPS is achieved (refer to FIG. 12).

Figure 21:
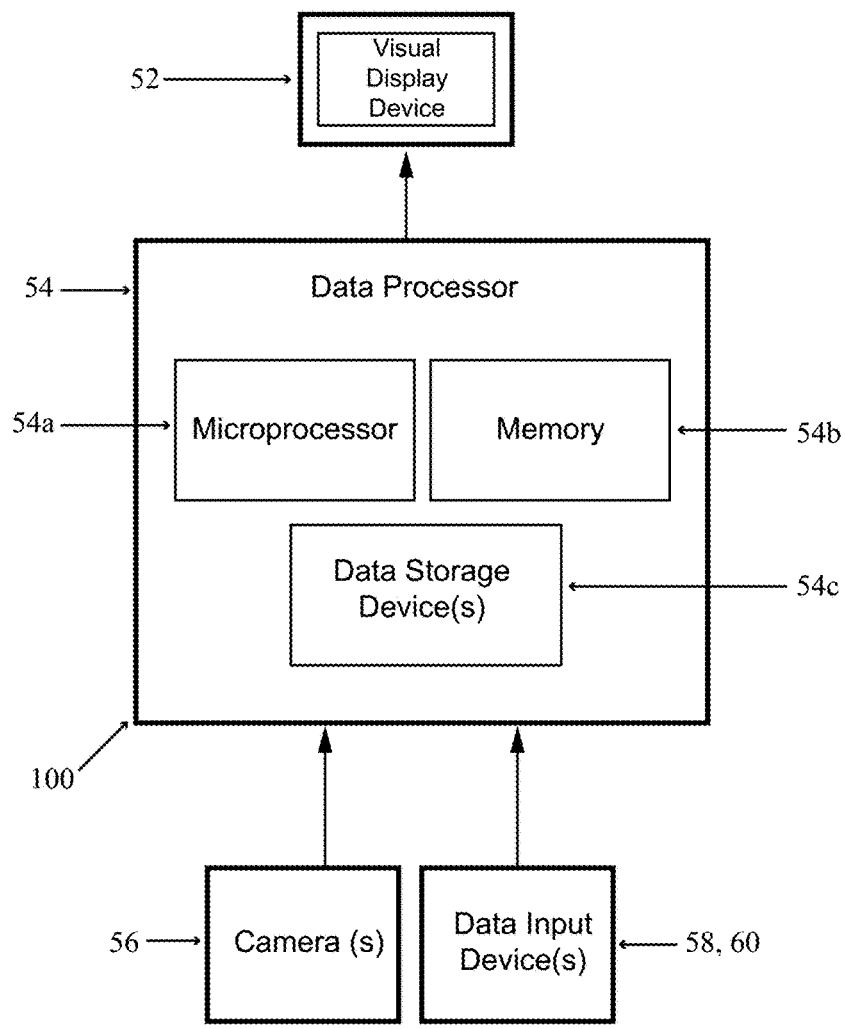
FIG. 21 is a block diagram of constituent components of an exemplary pose estimation system, according to an embodiment of the invention.

In the illustrative embodiment, with reference to FIG. 21, it can be seen that the exemplary system 100 comprises a camera 56 configured to capture an image of the scene and a data processor 54 operatively coupled to the camera 56. For example, in some embodiments, the camera 56 may comprise a camera disposed on a smartphone and the data processor 54 may comprise the central processing unit (CPU) of the smartphone. The data processor 54 (e.g., the CPU of the smartphone) is configured to execute computer executable instructions that perform the image processing functionality described hereinafter (i.e., the image processing functionality described in conjunction with software architecture hereinafter).

Now, turning again to FIG. 21, it can be seen that the illustrated data processor 54 of the pose estimation system 100 includes a microprocessor 54a for processing data, memory 54b (e.g., random access memory or RAM) for storing data during the processing thereof, and data storage device(s) 54c, such as one or more hard drives, compact disk drives, floppy disk drives, flash drives, or any combination thereof. As shown in FIG. 21, the camera(s) 56 and the visual display device 52 are operatively coupled to the data processor 54 such that data is capable of being transferred between these devices 52, 54, 56. Also, as illustrated in FIG. 21, a plurality of data input devices 58, 60, such as a keyboard and mouse, are diagrammatically shown in FIG. 21 as being operatively coupled to the data processor 54 so that a user is able to enter data into the data processing device 54. In some embodiments, the data processor 54 can be in the form of a desktop computer. For example, in the illustrative embodiment, the data processing device 54 coupled to the camera(s) 56 may have an Intel® Core i7 7th generation processor or greater, at least two NVIDIA® GeForce GTX 1080 Ti series graphics processing units (GPU) with at least eleven (11) gigabytes of memory, and thirty-two (32) gigabytes of random-access memory (RAM) or greater.

In a further illustrative embodiment, the system 100 comprises one or more additional cameras 56 configured to capture one or more additional images of the scene from varying perspectives, and the data processor 54 of the system 100 is configured to determine one or more three-dimensional (3D) poses of one or more persons in a scene.

In the illustrative embodiment, the executable instructions stored on the computer readable media (e.g., data storage device(s) 54c) of the data processor 54 may include an operating system, such as Microsoft Windows®, a programming application, such as Python™ (e.g., a version older than 2.7 or 3.5), and other software modules, programs, or applications that are executable by the data processor 54. For example, in addition to the operating system, the illustrative system 100 may contain the following other software modules: (i) Keras-Tensorflow, a library for implementing deep neural network algorithms; (ii) OpenCV, a library for computer vision algorithms; (iii) NumPy, a library supporting large, multi-dimensional arrays and matrices, along with a large collection of high-level mathematical functions to operate on these arrays; and (iv) SciPy, a library used for scientific computing and technical computing.

Now, the specific pose estimation software architecture of the illustrative system will be described with initial reference to FIG. 1. Hereinafter, each component of the system architecture will be described in detail.

1. The Shared Backbone

The shared backbone 20 of the illustrative software system (see FIG. 1) serves as a feature extractor for keypoint and person detection subnets. The shared backbone 20 extracts many different features from the image 10 (e.g., vertical edges; horizontal edges; parts of people, such as heads, legs, and other body parts; and compositions of the image). The pixels of the image 10 are first processed using the backbone 20 of the system. As such, the pixels of the image 10 are the input to the backbone 20. The backbone 20 of the system is actually a deep residual network (ResNet—see e.g., ref. [36]) with two Feature Pyramid Networks 22, 24 (FPNs—see e.g., ref. [39]) (one 22 for the keypoint subnet 30, the other 24 for the person detection subnet 40) connected to it, FPN creates pyramidal feature maps with top-down connections from all levels of CNN's feature hierarchy to make use of inherent multi-scale representations of a CNN feature extractor. The pyramidal structure of the backbone 20 allows hierarchal information to be obtained. The dimensions of the images are decreased in the higher levels of the pyramid. By doing so, FPN compromises high resolution, weak representations with low resolution, strong representations. Powerful localization and classification properties of FPN have been demonstrated to be very successful in detection, segmentation and keypoint tasks (see e.g., refs. [9, 11, 39, 41]). In the illustrative system, features are extracted from the last residual blocks with strides of (4, 8, 16, 32) pixels and corresponding FPN features per subnet are computed. The output of the backbone 20 is a feature tensor comprising information regarding parts, shapes, etc.

With reference again to the diagram of the system architecture depicted in FIG. 1, it can be seen that, in the illustrative embodiment, the residual blocks $C_2$, $C_3$, $C_4$, $C_5$ of the backbone 20 are the computational networks. The height of each computational network is proportional to the number of networks. Also, in the illustrative embodiment, the $C_2$ block has 256 layers, the $C_3$ block has 512 layers, the $C_4$ block has 1024 layers, and the $C_5$ block has 2048 layers. As shown in FIG. 1, $C_2$ is the lowest level of the computational network of the backbone 20, while $C_5$ is the highest level. In the backbone 20, the dimension of the output tensor with the highest resolution is 2048. As described hereinafter, at the end of the image processing, it is desired to have a tensor that has a total of 17 keypoints. Further, in the illustrative embodiment, the size of the computational networks is decreased by a factor 2 from $C_2$ to $C_5$ (i.e., the flow in backbone 20). In the illustrative embodiment, all of the layers in the $C_2$ block are going through a convolutional block.

2. Keypoint Estimation Subnet

Figure 4:
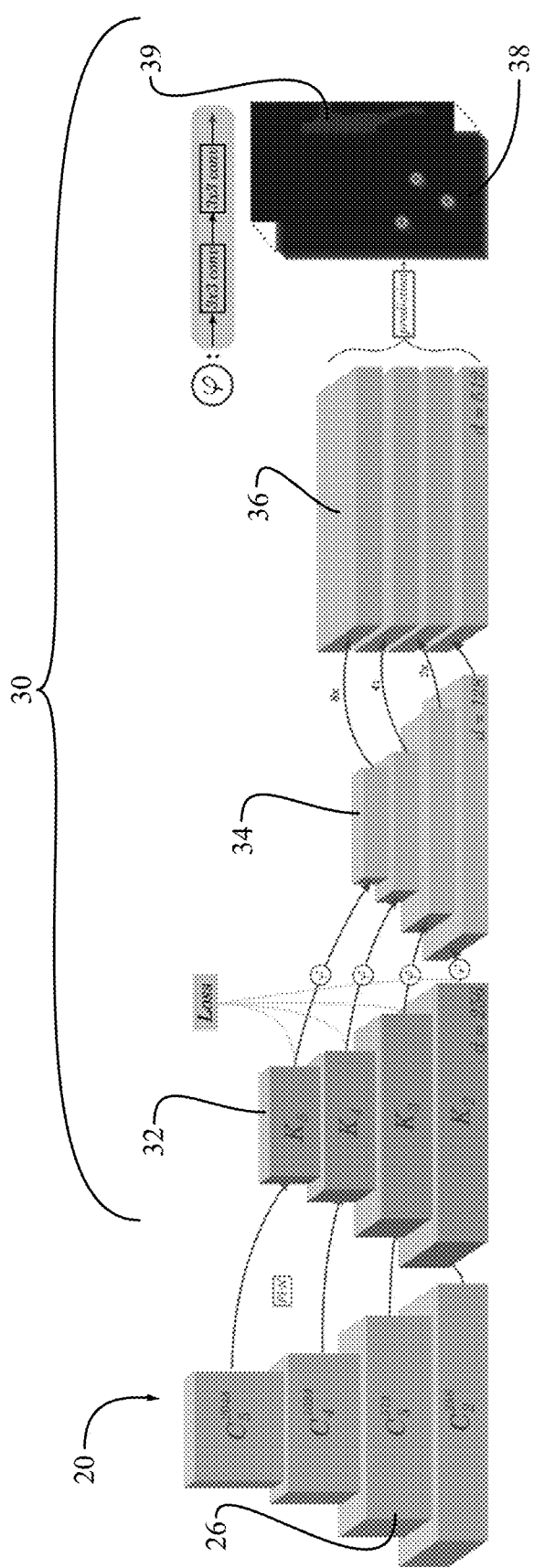
FIG. 4 is a schematic diagram of the keypoint subnet architecture used in conjunction with the pose estimation system described herein.

Now, the keypoint estimation subnet 30 of the illustrative system will be described with reference to FIG. 4. The blocks $C_2$ through $K_5$ are processed by the CNN algorithms. The keypoints are obtained from the backbone features. The keypoint estimation subnet 30 of the illustrative system (see FIG. 4) takes hierarchical CNN features (outputted by the corresponding FPN) and outputs keypoint and segmentation heatmaps 38, 39. Keypoint heatmaps 38 represent keypoint locations as Gaussian peaks. Each heatmap layer belongs to a specific keypoint class (nose, wrists, ankles, etc.) and contains an arbitrary number of peaks that pertain to person instances. The keypoint information contains joint locations, facial landmarks, etc. The heatmaps locate maxima, and encode the locations of the joints of the person or persons in the image. The person segmentation mask 39 at the last layer of heatmaps encodes the pixelwise spatial layout of people in the image.

A set of features specific to the keypoint detection task are computed with top-down and lateral connections from the bottom-up pathway. $K_2$-$K_5$ features 32 have the same spatial size corresponding to $C_2$-$C_5$ blocks 26, but the depth is reduced to 256 layers. In the illustrative embodiment, the K blocks 32 are part of the feature pyramid network. Also, in the illustrative embodiment, K features 32 generally are identical to P features 42 in a feature pyramid network, but these features are denoted with K herein to distinguish them from person detection subnet layers. The depth of P features 42 is downsized to 128 with 2 subsequent 3×3 convolutions to obtain $D_2$, $D_3$, $D_4$, $D_5$ layers. As shown in the illustrative embodiment of FIG. 4, the output of $K_5$ is the D feature 34 detection. In FIG. 4, the D features 34 are a downsampled version of the K features 32. Since D features 34 still have different strides, $D_3$, $D_4$, $D_5$ are upsampled accordingly to match 4-pixel stride as $D_2$ features and concatenated them into a single depth-512 layer feature map 36. That is, each layer of the pyramid is upsampled to get to the single depth-512 layer feature map 36 in FIG. 4. Concatenated features are smoothed by a 3×3 convolution with a rectified linear unit (ReLU). The final heatmap, which has (K+1) layers, is obtained via 1×1 convolutions without activation. The final output is multiplied with a binary mask of W which has W(p)=0 in the area of the persons without annotation. K is the number of human keypoints annotated in a dataset and K+1 is a person segmentation mask. In addition to the loss applied in the last layer, a loss was appended at each level of K features 32 to benefit from intermediate supervision. In FIG. 4, the loss function between the K blocks 32 and D blocks 34 is used to train the model by optimizing the network (i.e., to teach the network to predict keypoint heatmaps). Semantic person segmentation masks are predicted in the same way with keypoints. Then, after obtaining the single depth-512 layer feature map 36 in FIG. 4, the keypoint subnet downsamples in the depth dimension to 17 so as to obtain 17 different heatmaps 38, 39 that encode the locations of different body features (e.g., location of the nose, location of the left eye, location of the right eye, etc.). The quantity of 17 may be varied based upon the particular dataset that is desired.

3. Person Detection Subnet

Now, with reference again to FIG. 1, the person detection subnet 40 of the illustrative system will be explained. Modern object detectors typically are classified as one-stage detectors (e.g., Single Deep neural networks (SSD)—ref. [42], You Only Look Once object detection (YOLO)—ref. [43], and RetinaNet—ref. [41]) or two-stage detectors (e.g., Fast Region-based Convolutional Neural Networks (Fast R-CNN)—ref. [44] and Faster Region-based Convolutional Neural Networks (Faster R-CNN)—ref. [45]). One-stage detectors enable faster inference but have lower accuracy in comparison to two-stage detectors due to foreground-background class imbalance. The recently proposed RetinaNet model (see e.g., ref. [41]) improved the performance of one-stage detectors with focal loss which can handle the class imbalance problem during training. In order to design a faster and simpler person detection model which is compatible with FPN backbone, the illustrative system described herein utilizes RetinaNet. Same strategies to compute anchors, losses and pyramidal image features are followed. Classification and regression heads are modified to handle only person annotations. P features 42 are the output of the backbone 20, and hence the input to the person detection subnet 40. There are many anchors 44 associated with the images (e.g., 10,000 anchors). Although, for the purpose of the person detection subnet 40, only the anchors 44 that hold an object inside of them are relevant. For example, in an image containing two people (i.e., a 2-person image), only the two anchors 44 pertaining to the two people are relevant. In FIG. 1, person class detection is the focus (e.g., as represented by the cls box 46 in FIG. 1), wherein it is determined if each anchor 44 applies to the background or to person instances. In FIG. 1, the regression operation fine tunes the bounding box around the object (e.g., as represented by the reg box 48 in FIG. 1).

In the illustrative embodiment of the person detection subnet 40 depicted in FIG. 1, it can be seen that there is an output from every layer of P. For every layer of P, the output goes to the classification network. In the illustrative embodiment, nine (9) anchors 44 are used, each with a different ratio. The anchors 44 are representative of the bounding box

49. For each anchor, a heatmap is obtained. In the illustrative embodiment, a classification is used for the anchor (e.g., higher than 0.5). In the illustrative embodiment, the output of the person detection subnet 40 is in the form of matrices containing bounding box coordinates (i.e., the network predicts the four coordinates of the bounding box).

4. Pose Residual Network (PRN)

Figure 5:
FIG. 5 illustrates a first example of a bounding box overlapping scenario that may be analyzed using the pose estimation system described herein.
Figure 6:
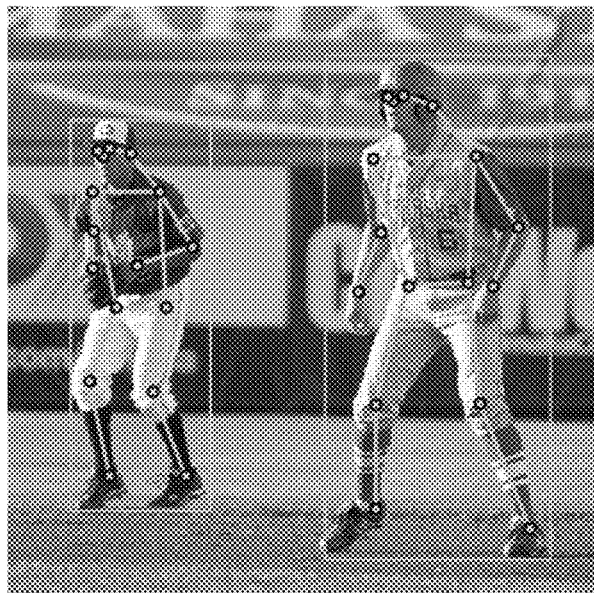
FIG. 6 illustrates a second example of a bounding box overlapping scenario that may be analyzed using the pose estimation system described herein.
Figure 7:
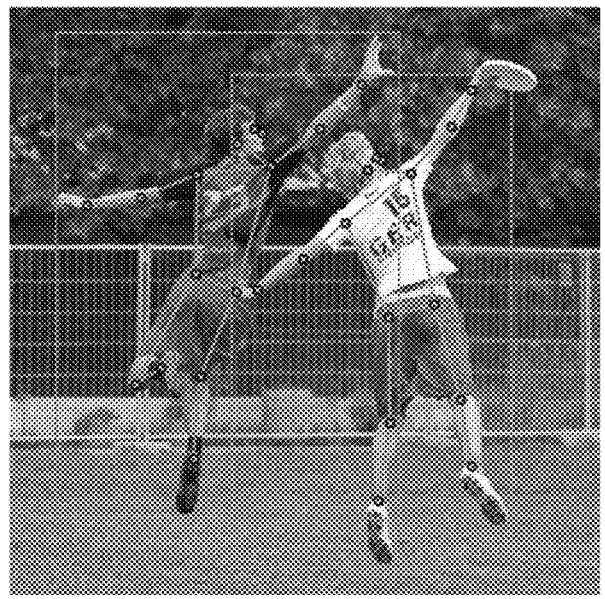
FIG. 7 illustrates a third example of a bounding box overlapping scenario that may be analyzed using the pose estimation system described herein.
Figure 8:
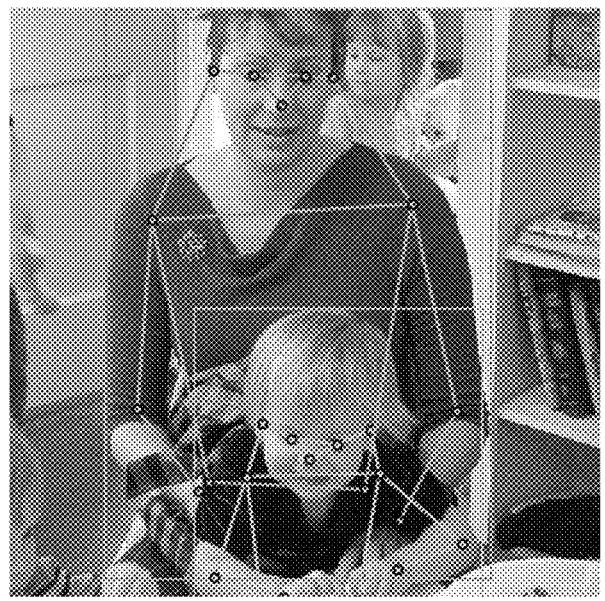
FIG. 8 illustrates a fourth example of a bounding box overlapping scenario that may be analyzed using the pose estimation system described herein.

Assigning keypoint detections to person instances (bounding boxes, in the case of the illustrative embodiment) is straightforward if there is only one person in the bounding box as in FIGS. 5 and 6. However, the assignment becomes non-trivial if there are overlapping people in a single box as in FIGS. 7 and 8. When the person instances are far away from one another, the identification of person instances is straightforward. Although, when there are overlapping bounding boxes, it has to be determined which keypoints belong to which bounding boxes (e.g., in the case of the overlap in FIG. 8). In the case of an overlap, a bounding box can contain multiple keypoints not related to the person in question, so this creates ambiguity in constructing final pose predictions. These ambiguities are solved herein by learning pose structures from data. Advantageously, the pose residual network (PRN) 50 of the pose estimation system described herein is able to disambiguate which keypoint should be assigned to the current person box. In general, the inputs to the pose residual network (PRN) 50 are: (1) keypoint heatmaps from the keypoint subnet, and (2) coordinates of the bounding boxes from the person detection subnet.

In the illustrative embodiment, the heatmap outputs from the keypoint subnet 30 are inputs to the pose residual network (PRN) 50. The keypoint heatmaps 38, 39 are cropped to fit the bounding boxes (i.e., the PRN 50 crops the heatmaps 38, 39 around the locations of the bounding boxes 49). The PRN 50 is run for the cropping of each image. In the illustrative embodiment, the 17 layer heat map 38, 39 is cropped according to the bounding box 49, and the heat map is vectorized. In the illustrative embodiment, the residuals make irrelevant keypoints disappear, and the pose residual network 50 deletes irrelevant keypoints. For example, with the image depicted in FIG. 8, when the PRN is trying to detect the mother, then the PRN needs to eliminate the baby's keypoints (e.g., in eq. (1), the unrelated keypoints are suppressed; in this case the keypoints of the baby are suppressed). In the illustrative embodiment, the pose residual network (PRN) 50 is a single layer network, and there are 1024 nodes in the single layer. Every node has 30 outputs in the illustrative embodiment.

The input to pose residual network (PRN) 50 is prepared as follows. For each person box 49 that the person detection subnet 40 detected, the region from the keypoint detection subnet's output, corresponding to the box, is cropped and resized to a fixed size, which ensures that PRN 50 can handle person detections of arbitrary sizes and shapes. Specifically, let X denote the input to the PRN, where $X=\{x_1, x_2, \ldots, x_k\}$ in which $x_k \in R^{W \times H}$, k is the number of different keypoint types. The final goal of PRN 50 is to output Y where $Y=\{y_1, y_2, \ldots, y_k\}$, in which $y_k \in R^{W \times H}$ is of the same size as $x_k$, containing the correct position for each keypoint indicated by a peak in that channel of the keypoint. PRN models the mapping from X to Y as:

$$y_k = \varphi_k(X) + x_k \quad (1)$$

where the functions $\varphi_1(\bullet), \ldots, \varphi_k(\bullet)$ apply a residual correction to the pose in X, hence the name pose residual network. The phi function in equation (1) is a deep learning model residual. Equation (1) is implemented using a residual multilayer perceptron (see FIG. 2). The residual multilayer perceptron is a machine learning model. In equation (1), the keypoints are an input, the suppressed version is summed with the original. The PRN wants to eliminate the background so that only the maximal locations remain. A tensor heatmap is an input with multiple keypoints. Activation of the output layer uses softmax to obtain a proper probability distribution and binary cross-entropy loss is used during training.

Before this residual model was developed, experimentations were done with two naive baselines and a non-residual model. In the first baseline method, which shall be named Max, for each keypoint channel k, the location with the highest value is found and a Gaussian is placed in the corresponding location of the $k^{th}$ channel in Y. In the second baseline method, Y is computed as:

$$y_k = x_k * P_k \quad (2)$$

where $P_k$ is a prior map for the location of the $k^{th}$ joint, learned from ground-truth data and * is element-wise multiplication. This method is named Unary Conditional Relationship (UCR). Finally, in the non-residual model, the following was implemented:

$$y_k = \varphi_k(X) \quad (3)$$

Performances of all these models can be found in the table of FIG. 16. The ground-truth data is human annotated images.

In the context of the models described above, both SOTA bottom up methods learn lower order grouping models than the PRN. Cao et al. (ref. [2]) model pairwise channels in X while Newell et al. (ref. [8]) model only unary channels in X.

In the illustrative embodiment, it is presumed that each node in the hidden layer of the PRN encodes a certain body configuration. To demonstrate this, some of the representative outputs of PRN were visualized in FIG. 3. These poses are obtained via reshaping PRN outputs and selecting the maximum activated keypoints to form skeletons. In other words, the maximum activated keypoints are taken as outputs to form skeletons. All obtained configurations are clustered using k-means with OKS (object keypoint similarity) (ref. [1]) and cluster means are visualized in FIG. 3. OKS (object keypoint similarity) is used as k-means distance metric to cluster the meaningful poses.

In a further illustrative embodiment, the system may be configured to assign keypoint detections to person instances by additionally considering one or more further images depicting a movement of the one or more persons over a period of time.

5. Implementation Details

Now, the implementation details of the illustrative embodiment will be explained. Due to different convergence times and loss imbalance, keypoint and person detection tasks have been trained separately. To use the same backbone in both tasks, we first trained the model with only the keypoint subnet (see FIG. 4). Thereafter, the backbone parameters were frozen, and the person detection subnet was trained. Because the two tasks are semantically similar, person detection results were not adversely affected by the frozen backbone.

In the illustrative embodiment, Tensorflow (ref. [46]) and Keras (ref. [47]) deep learning library have been utilized to implement training and testing procedures. For person detection, the open-source Keras RetinaNet (ref. [48]) implementation was used.

The training of the keypoint estimation subnet now will be described. For keypoint training, 480×480 image patches were used, which were centered around the crowd or the main person in the scene. Random rotations between ±40 degrees, random scaling between 0.8-1.2 and vertical flipping with a probability of 0.3 was used during training. The ImageNet (see ref. [49]) pretrained weights for each backbone were transferred before training. The model was optimized with Adam (see ref. [50]) starting from learning rate 1e-4 and this was decreased by a factor of 0.1 in plateaus. The Gaussian peaks located at the keypoint locations were used as the ground truth to calculate $L_2$ loss, and people that were not annotated were masked (ignored). The segmentation masks were appended to ground-truth as an extra layer and the masks were trained along with keypoint heatmaps. The cost function that was minimized is:

$$L_{kp} = W \cdot \|H_t - H_p\|_2^2 \quad (4)$$

where $H_t$ and $H_p$ are the ground-truth and predicted heatmaps respectively, and $W$ is the mask used to ignore non-annotated person instances.

The training of the person detection subnet now will be described. In the illustrative embodiment, a person detection training strategy was followed, which was similar to that in Lin et al. (ref. [41]). Images containing persons were used, and they were resized such that shorter edge is 800 pixels. In the illustrative embodiment, backbone weights after keypoint training were frozen and not updated during person detection training. The person detection subnet was optimized with Adam (ref. [50]) starting from the learning rate 1e-5 and then decreased by a factor of 0.1 in plateaus. Focal loss with ($\gamma=2$, $\alpha=0.25$) and smooth $L_1$ loss was used for classification and bbox regression, respectively. The final proposals were obtained using non-maximum suppression (NMS) with a threshold of 0.3.

Next, the training of the pose residual network (PRN) will be described. In the illustrative embodiment, during the training of the pose residual network, input and output pairs were cropped and heatmaps were resized according to bounding-box proposals. All crops were resized to a fixed size of 36×56 (height/width=1.56). The PRN network was trained separately and Adam optimizer (ref. [50]) with a learning rate of 1e-4 was used during training. Since the model was shallow, convergence took approximately 1.5 hours.

The model was trained with the person instances which had more than 2 keypoints. A sort of curriculum learning (ref. [51]) was utilized by sorting annotations based on the number of keypoints and bounding box areas. In each epoch, the model started to learn easy-to-predict instances, and hard examples were given in later stages.

In the illustrative embodiment, the whole architecture (refer to FIG. 1) operates as a monolithic, end-to-end model during test time. First, an image (W×H×3) is processed through the backbone model to extract the features in multi-scales. Person and keypoint detection subnets compute outputs simultaneously out of extracted features. Keypoints are outputted as W×H×(K+1) sized heatmaps. K is the number of keypoint channels, and K+1 is for the segmentation channel. Person detections are in the form of N×5, where N is the number of people and 5 channel corresponds to 4 bounding box coordinates along with confidence scores. Keypoint heatmaps are cropped and resized to form regions-of-interest (RoIs) according to person detections. In the illustrative embodiment, optimal RoI size is determined to be 36×56×(K+1). PRN takes each RoI as separate input, then outputs same size RoI with only one keypoint selected in each layer of heatmap. All selected keypoints are grouped as a person instance.

6. Experimental Testing—Datasets

Now, the experimental testing carried out with the illustrative system will be explained. In the experimental testing, the keypoint and person detection models were trained on the COCO keypoints dataset (ref. [1]) without using any external/extra data. COCO was used for evaluating the keypoint and person detection, however, PASCAL VOC 2012 (ref. [52]) was used for evaluating person segmentation due to the lack of semantic segmentation annotations in COCO. Backbone models (ResNet-50 and ResNet-101) were pretrained on ImageNet and were finetuned with COCO-keypoints.

COCO train2017 split contains 64K images including 260K person instances which 150K of them have keypoint annotations. Keypoints of persons with small area are not annotated in COCO. Ablation experiments were performed on COCO val2017 split which contains 2693 images with person instances. Comparisons were made to previous methods on the test-dev2017 split which has 20K test images. Test-dev2017 results were evaluated on the online COCO evaluation server. The official COCO evaluation metric average precision (AP) and average recall (AR) were used. OKS and intersection over union (IoU) based scores were used for keypoint and person detection tasks, respectively.

Person segmentation evaluation was performed in PASCAL VOC 2012 test split with PASCAL IoU metric. PASCAL VOC 2012 person segmentation test split contains 1456 images. "Test results" were obtained using the online evaluation server.

7. Experimental Testing—Multi-Person Pose Estimation

Figure 9:
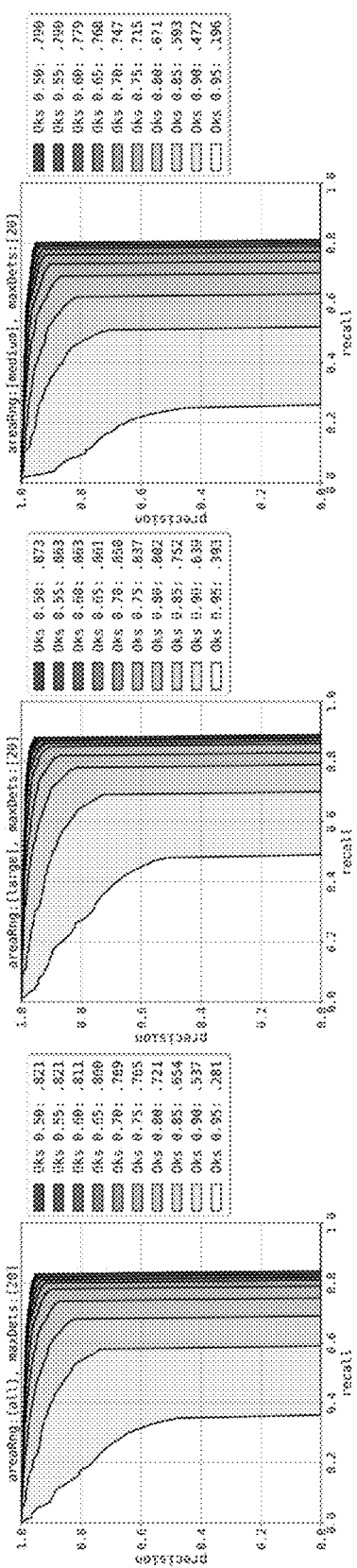
FIG. 9 illustrates precision-recall curves on COCO validation set across all, large and medium scales for the pose estimation system described herein.

In FIG. 9, the recall-precision curves of the illustrative method are presented for the different scales: (i) all, (ii) large, and (iii) medium. The overall average precision (AP) results of the illustrative method along with top-performing bottom-up (BU) and top-down (TD) methods are given in the table of FIG. 13. It can be seen that illustrative system described herein outperforms all bottom-up methods and most of the top-down methods. In particular, it can be seen that the previously best bottom-up method (see ref. [8]) is outperformed by a 4-point increase in mAP. In addition, the runtime speed (refer to FIG. 12 and the FPS column in the table of FIG. 13) of the system described herein is far better than previous methods with 23 FPS on average. During the testing of the system, FPS results were obtained by averaging the inference time using images containing three (3) people (avg. number of person annotations per image in COCO dataset) on a GTX1080 Ti GPU. Except for CFN and Mask RCNN, the FPS numbers were obtained by running the models under equal conditions. CFN's FPS and Mask RCNN's FPS were obtained from the published results in their respective papers, and the COCO-only results for GRMI-2017 in the table of FIG. 13 were obtained from a presentation at Joint Workshop of the COCO and Places Challenges at ICCV 2017. The tabulated results prove the effectiveness of the illustrative system for assignment and the multitask detection approach utilized while providing reasonable speed-accuracy tradeoff. To get these results (see FIG. 13) on test-dev, test time augmentation and ensembling was utilized (as also done in all previous systems). Multi scale and multi crop testing was performed during test time data augmentation. Two different backbones and a single person pose refinement network similar to the keypoint detection model were used for ensembling. Results from different models are gathered and redundant detections were removed via OKS based non-maximum suppression NMS (see Papandreou et al., ref. [10]).

During ablation experiments, the effect of different backbones, keypoint detection architectures, and PRN designs have been inspected. In the tables presented in FIGS. 14-17, the ablation analysis results on COCO validation set can be seen.

ResNet models (see ref. [36]) were used as a shared backbone to extract features. In the tables of FIGS. 14 and 15, the impact of deeper features and dilated features can be seen. R101 improved the result 1.6 mAP over R50. Dilated convolutions (see ref. [37]) which are very successful in dense detection tasks increased accuracy 2 mAP over R50 architecture. However, dilated convolutional filters add more computational complexity, consequently hinder real-time performance. In the illustrative embodiment, the concatenation of K features and intermediate supervision (refer to explanation above for the keypoint estimation subnet) resulted in good performance. The results demonstrated that the performance of the illustrative system can be further enhanced with stronger feature extractors like recent ResNext architectures (see ref. [54]).

Keypoint estimation requires dense prediction over spatial locations, so its performance is dependent on input and output resolution. In the illustrative experiments, 480×480 images were used as inputs and 120×120×(K+1) heatmaps were outputted per input. K is equal to 17 for COCO dataset. The lower resolutions harmed the mAP results, while higher resolutions yielded longer training and inference complexity. The results of different keypoint models are listed in the table of FIG. 14. In the table of FIG. 14, no concatenation is abbreviated "no concat", no intermediate supervision is abbreviated "no int", "dilated" is abbreviated "dil", and concatenation is abbreviated "concat".

The intermediate loss which is appended to the outputs of K block's (see FIG. 4) enhanced the precision significantly. Intermediate supervision acts as a refinement process among the hierarchies of features. As previously shown in refs. [2, 13, 14], it is an important strategy in most of the dense detection tasks.

In the illustrative embodiment, a final loss to the concatenated D features was applied, which was downsized from K features. This additional stage ensured combining multi-level features and compressing them into a uniform space while extracting more semantic features. This strategy brought 2 mAP gain in the illustrative experiments.

The pose residual network (PRN) described herein is a simple, yet effective assignment strategy, and is designed for faster inference while giving reasonable accuracy. To design an accurate model, different configurations were tried. Different PRN models and corresponding results can be seen in the table of FIG. 16. The results presented in the table of FIG. 16 indicate the scores obtained from the assignment of ground truth person bounding boxes and keypoints. In the table of FIG. 16, nodes are abbreviated "N", dropout is abbreviated "D", and "residual connection" is abbreviated "R".

Initially, a primitive model which is a single hidden-layer MLP with 50 nodes was used, and then more nodes, regularization and different connection types were added to balance speed and accuracy. It was found that 1024 nodes MLP, dropout with 0.5 probability and residual connection between input and output boosted the PRN performance up to 89.4 mAP on ground truth inputs.

In ablation analysis of PRN (refer to the table in FIG. 17), Max, UCR and PRN implementations were compared (see the explanation of the pose residual network (PRN) described above for descriptions) along with the performance of PRN with ground truth detections. It was found that lower order grouping methods could not handle overlapping detections (i.e., both of them were found to perform poorly). It was determined that the PRN overcame the ambiguities by learning meaningful pose structures (see FIG. 3) and improved the results by ~20 mAP over naive assignment techniques. The impact of keypoint and person subnets on the final results were evaluated by alternating inputs of PRN with ground truth detections. With ground truth keypoints and the person detections of the illustrative embodiment, 75.3 mAP was obtained, which demonstrates that there is a large room for improvement in the keypoint localization part. With keypoints and ground truth person detections of the illustrative embodiment, 65.1 mAP was obtained. As such, it is evident that the person detection subnet of the illustrative embodiment performs quite well. Both ground truth detections got 89.4 mAP, which is a good indicator of PRN performance. In addition to these experiments, PRN was tested on the keypoints detected by previous SOTA bottom-up models (refs. [2, 8]). Consequently, PRN performed better grouping (see the table in the FIG. 18) than the methods in references [2, 8]: *Part Affinity Fields* in reference [2] and *Associative Embedding* in reference [8] by improving both detection results by ~1 mAP. To obtain the results in the table of FIG. 18, the COCO val split, the person bounding box results determined herein, and the keypoint results from the source code of the references [2, 8] were used. Note that running PRN on keypoints that were not generated by the pose estimation system described herein is unfair to PRN because it is trained with the detection architecture described herein. Moreover original methods use image features for assignment coupled with their detection scheme, nonetheless, PRN is able to outperform the other grouping methods.

8. Experimental Testing—Person Detection

In the illustrative embodiment, the person detection subnet was trained only on COCO person instances by freezing the backbone with keypoint detection parameters. The person category results of the network with different backbones can be seen in the table of FIG. 19. The results of the illustrative embodiment were compared results with the results of the original methods in the literature. It can be seen that the model presented herein with both ResNet-50 and ResNet-101 backends outperformed the original implementations. This is not a surprising result since the network described herein is only dealing with a single class, whereas the original implementations handle 80 object classes.

9. Experimental Testing—Person Segmentation

Figure 10:
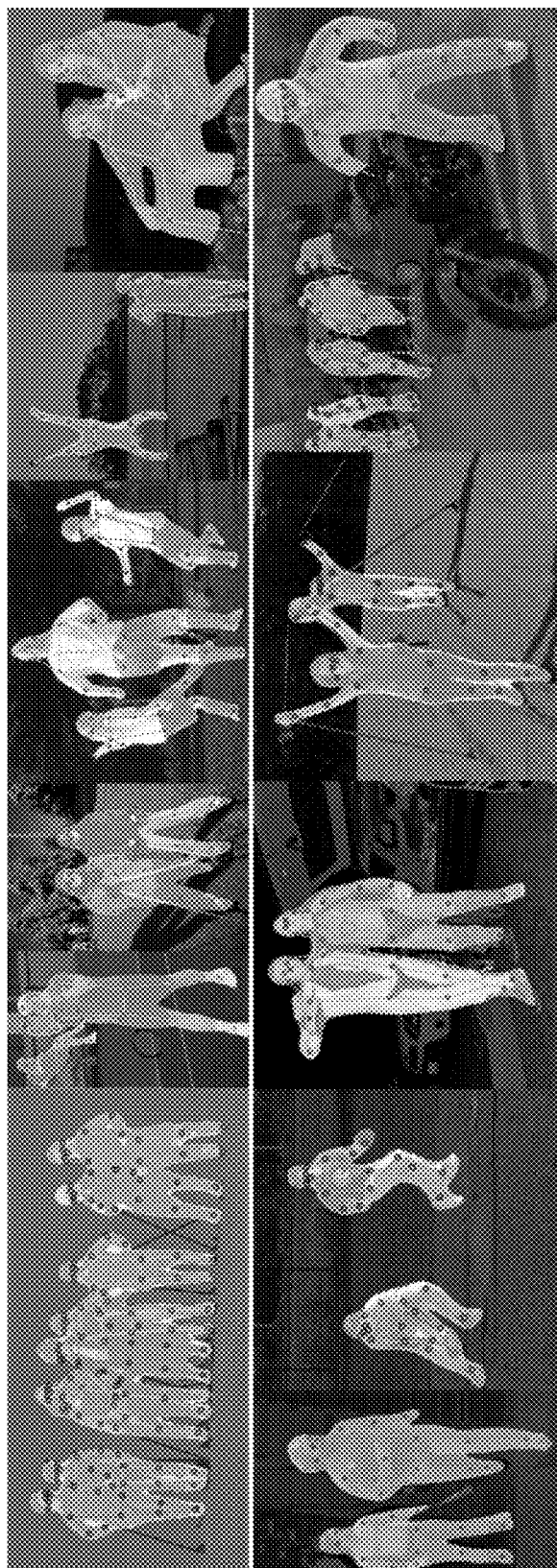
FIG. 10 illustrates some qualitative results for the COCO test-dev dataset for the pose estimation system described herein.

Person segmentation output is an additional layer appended to the keypoint outputs. Ground truth labels were obtained by combining person masks into a single binary mask layer, and jointly training segmentation with keypoint task. Therefore, it added very small complexity to the model. Evaluation was performed on PASCAL VOC 2012 test set with PASCAL IoU metric. Final segmentation results were obtained via multi-scale testing and thresholding. No additional test-time augmentation or ensembling were applied. The table in FIG. 20 shows the test results of illustrative system described herein in comparison with previous successful semantic segmentation algorithms. The model presented herein outperformed most of the successful baseline models such as SegNet [56] and Deeplab-v2 [37], and got comparable performance to the state-of-the-art Deeplab v3 [55] model. This demonstrates the capacity of the model presented herein to handle different tasks altogether with competitive performance. Some qualitative segmentation results are given in FIG. 10.

10. Experimental Testing—Runtime Analysis

Figure 11:
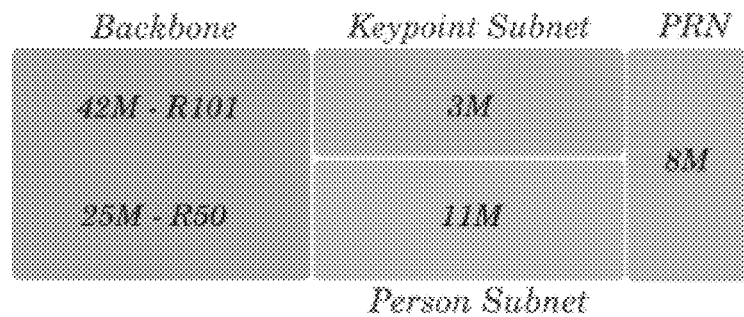
FIG. 11 illustrates the number of parameters for each block of the pose estimation system described herein.

The illustrative system described herein comprises a backbone, keypoint and person detection subnets, and the pose residual network. The parameter sizes of each block are given in FIG. 11. Most of the parameters are required to extract features in the backbone network, the subnets and PRN are relatively lightweight networks. As such, most of the computation time is spent on the feature extraction stage. By using a shallow feature extractor like ResNet-50, real-time performance can be achieved. To measure the performance, a model was built using ResNet-50 with 384×576 sized inputs which contain 1 to 20 people. The time spent during the inference of 1000 images was measured, and the inference times were averaged to get a consistent result (see FIG. 12). Keypoint and person detections take 35 ms while PRN takes 2 ms per instance. Thus, the model described herein can perform between 27 (1 person) and 15 (20 persons) FPS depending on the number of people.

11. Conclusion

It is readily apparent that the aforedescribed pose estimation system offer numerous advantages and benefits. First of all, the Pose Residual Network (PRN) utilized by the pose estimation system is a simple yet very effective method for the problem of assigning/grouping body joints. Secondly, the pose estimation methods described herein outperform all previous bottom-up methods and achieve comparable performance with top-down methods. Thirdly, the pose estimation method described herein operates faster than all previous methods, in real-time at approximately 23 frames per second. Finally, the network architecture of the pose estimation system is extendible (i.e., using the same backbone, other related problems may also be solved, such as person segmentation).

Advantageously, the Pose Residual Network (PRN) described herein is able to accurately assign keypoints to person detections outputted by a multi-task learning architecture. The method employed by the pose estimation system described herein achieves state-of-the-art performance among bottom-up methods and comparable results with top-down methods. The pose estimation method has the fastest inference time compared to previous methods. The assignment performance of pose residual network ablation analysis was demonstrated. The representational capacity of the multi-task learning model described herein was demonstrated by jointly producing keypoints, person bounding boxes and person segmentation results.

While reference is made throughout this disclosure to, for example, "an illustrative embodiment", "one embodiment", or a "further embodiment", it is to be understood that some or all aspects of these various embodiments may be combined with one another as part of an overall embodiment of the invention. That is, any of the features or attributes of the aforedescribed embodiments may be used in combination with any of the other features and attributes of the aforedescribed embodiments as desired.

Each reference listed below is expressly incorporated by reference herein in its entirety:

[1] Lin, T. Y., Maire, M., Belongie, S., Hays, J., Perona, P., Ramanan, D., Dollár, P., Zitnick, C. L.: Microsoft COCO: Common objects in context. In: European Conference on Computer Vision. (2014)

[2] Cao, Z., Simon, T., Wei, S. E., Sheikh, Y.: Realtime Multi-Person 2D Pose Estimation using Part Affinity Fields. In: IEEE Conference on Computer Vision and Pattern Recognition. (2017)

[3] Pishchulin, L., Insafutdinov, E., Tang, S., Andres, B., Andriluka, M., Gehler, P., Schiele, B.: DeepCut: Joint Subset Partition and Labeling for Multi Person Pose Estimation. In: IEEE Conference on Computer Vision and Pattern Recognition. (2016)

[4] Insafutdinov, E., Pishchulin, L., Andres, B., Andriluka, M., Schiele, B.: Deepercut: A deeper, stronger, and faster multi-person pose estimation model. In: European Conference on Computer Vision. (2016)

[5] Bulat, A., Tzimiropoulos, G.: Human pose estimation via convolutional part heatmap regression. In: European Conference on Computer Vision. (2016)

[6] Iqbal, U., Gall, J.: Multi-person pose estimation with local joint-to-person associations. In: European Conference on Computer Vision Workshops. (2016)

[7] Ning, G., Zhang, Z., He, Z.: Knowledge-Guided Deep Fractal Neural Networks for Human Pose Estimation. In: IEEE Transactions on Multimedia. (2017)

[8] Newell, A., Huang, Z., Deng, J.: Associative Embedding: End-to-End Learning for Joint Detection and Grouping. In: Advances in Neural Information Processing. (2017)

[9] Chen, Y., Wang, Z., Peng, Y., Zhang, Z., Yu, G., Sun, J.: Cascaded Pyramid Network for Multi-Person Pose Estimation. In: arXiv preprint arXiv:1711.07319. (2017)

[10] Papandreou, G., Zhu, T., Kanazawa, N., Toshev, A., Tompson, J., Bregler, C., Murphy, K.: Towards Accurate Multi-person Pose Estimation in the Wild. In: IEEE Conference on Computer Vision and Pattern Recognition. (2017)

[11] He, K., Gkioxari, G., Dollár, P., Girshick, R.: Mask R-CNN. In: International Conference on Computer Vision. (2017)

[12] Fang, H., Xie, S., Tai, Y., Lu, C.: RMPE: Regional Multi-Person Pose Estimation. In: International Conference on Computer Vision. (2017)

[13] Wei, S. E., Ramakrishna, V., Kanade, T., Sheikh, Y.: Convolutional Pose Machines. In: IEEE Conference on Computer Vision and Pattern Recognition. (2016)

[14] Newell, A., Yang, K., Deng, J.: Stacked Hourglass Networks for Human Pose Estimation. In: European Conference on Computer Vision. (2016)

[15] Chou, C. J., Chien, J. T., Chen, H. T.: Self Adversarial Training for Human Pose Estimation. In: arXiv preprint arXiv:1707.02439. (2017)

[16] Huang, S., Gong, M., Tao, D.: A Coarse-Fine Network for Keypoint Localization. In: International Conference on Computer Vision. (2017)

[17] Dalal, N., Triggs, B.: Histograms of Oriented Gradients for Human Detection. In: IEEE Conference on Computer Vision and Pattern Recognition. (2005)

[18] Pishchulin, L., Andriluka, M., Gehler, P., Schiele, B.: Poselet conditioned pictorial structures. In: IEEE Conference on Computer Vision and Pattern Recognition. (2013)

[19] Yang, Y., Ramanan, D.: Articulated pose estimation with flexible mixtures-of-parts. In: IEEE Transaction on Pattern Analysis and Machine Intelligence. (2013)

[20] Johnson, S., Everingham, M.: Clustered Pose and Nonlinear Appearance Models for Human Pose Estimation. In: British Machine Vision Conference. (2010)

[21] Andriluka, M., Roth, S., Schiele, B.: Pictorial Structures Revisited: People Detection and Articulated Pose Estimation. In: IEEE Conference on Computer Vision and Pattern Recognition. (2009)

[22] Dantone, M., Gall, J., Leistner, C., Van Gool, L.: Human Pose Estimation Using Body Parts Dependent Joint Regressors. In: IEEE Conference on Computer Vision and Pattern Recognition. (2013)

[23] Gkioxari, G., Hariharan, B., Girshick, R., Malik, J.: Using k-poselets for detecting people and localizing their keypoints. In: IEEE Conference on Computer Vision and Pattern Recognition. (2014)

[24] Toshev, A., Szegedy, C.: DeepPose: Human Pose Estimation via Deep Neural Networks. In: IEEE Conference on Computer Vision and Pattern Recognition. (2014)

[25] Tompson, J., Jain, A., LeCun, Y., Bregler, C.: Joint Training of a Convolutional Network and a Graphical Model for Human Pose Estimation. In: Advances in Neural Information Processing. (2014)

[26] Carreira, J., Agrawal, P., Fragkiadaki, K., Malik, J.: Human Pose Estimation with Iterative Error Feedback. In: IEEE Conference on Computer Vision and Pattern Recognition. (2016)

[27] Chu, X., Yang, W., Ouyang, W., Ma, C., Yuille, A. L., Wang, X.: Multi-Context Attention for Human Pose Estimation. In: IEEE Conference on Computer Vision and Pattern Recognition. (2017)

[28] Lifshitz, I., Fetaya, E., Ullman, S.: Human Pose Estimation using Deep Consensus Voting. In: European Conference on Computer Vision. (2016)

[29] Belagiannis, V., Zisserman, A.: Recurrent Human Pose Estimation. In: International Conference on Automatic Face and Gesture Recognition. (2017)

[30] Ramakrishna, V., Munoz, D., Hebert, M., Bagnell, A. J., Sheikh, Y.: Pose machines: Articulated pose estimation via inference machines. In: European Conference on Computer Vision. (2014)

[31] Szegedy, C., Vanhoucke, V., Ioffe, S., Shlens, J., Wojna, Z.: Rethinking the inception architecture for computer vision. In: IEEE Conference on Computer Vision and Pattern Recognition. (2016)

[32] Ladicky, L., Torr, P. H., Zisserman, A.: Human Pose Estimation Using a Joint Pixelwise and Part-wise Formulation. In: IEEE Conference on Computer Vision and Pattern Recognition. (2013)

[33] Gkioxari, G., Arbelaez, P., Bourdev, L., Malik, J.: Articulated pose estimation using discriminative armlet classifiers. In: IEEE Conference on Computer Vision and Pattern Recognition. (2013)

[34] Varadarajan, S., Datta, P., Tickoo, O.: A Greedy Part Assignment Algorithm for Realtime Multi-Person 2D Pose Estimation. In: arXiv preprint arXiv:1708.09182. (2017)

[35] Iqbal, U., Milan, A., Gall, J.: PoseTrack: Joint Multi-Person Pose Estimation and Tracking. In: IEEE Conference on Computer Vision and Pattern Recognition. (2017)

[36] He, K., Zhang, X., Ren, S., Sun, J.: Deep Residual Learning for Image Recognition. In: IEEE Conference on Computer Vision and Pattern Recognition. (2016)

[37] Chen, L. C., Papandreou, G., Kokkinos, I., Murphy, K., Yuille, A. L.: DeepLab: Semantic Image Segmentation with Deep Convolutional Nets, Atrous Convolution, and Fully Connected CRFs. In: IEEE Transaction on Pattern Analysis and Machine Intelligence. (2017)

[38] Xia, F., Wang, P., Yuille, A., Angeles, L.: Joint Multi-Person Pose Estimation and Semantic Part Segmentation in a Single Image. In: IEEE Conference on Computer Vision and Pattern Recognition. (2017)

[39] Lin, T. Y., Dollár, P., Girshick, R., He, K., Hariharan, B., Belongie, S.: Feature Pyramid Networks for Object Detection. In: IEEE Conference on Computer Vision and Pattern Recognition. (2017)

[40] Kong, T., Yao, A., Chen, Y., Sun, F.: Hypernet: Towards accurate region proposal generation and joint object detection. In: IEEE Conference on Computer Vision and Pattern Recognition. (2016)

[41] Lin, T. Y., Goyal, P., Girshick, R., He, K., Dollár, P.: Focal loss for dense object detection. In: International Conference on Computer Vision. (2017)

[42] Liu, W., Anguelov, D., Erhan, D., Szegedy, C., Reed, S., Fu, C. Y., Berg, A. C.: SSD: Single shot multibox detector. In: European Conference on Computer Vision. (2016)

[43] Redmon, J., Divvala, S. K., Girshick, R. B., Farhadi, A.: You Only Look Once: Unified, Real-Time Object Detection. In: IEEE Conference on Computer Vision and Pattern Recognition. (2016)

[44] Girshick, R.: Fast R-CNN. In: International Conference on Computer Vision. (2015)

[45] Ren, S., He, K., Girshick, R., Sun, J.: Faster R-CNN: Towards real-time object detection with region proposal networks. In: Advances in Neural Information Processing. (2015)

[46] Abadi, M., Agarwal, A., Barham, P., Brevdo, E., Chen, Z., Citro, C., Corrado, G. S., Davis, A., Dean, J., Devin, M., Ghemawat, S., Goodfellow, I., Harp, A., Irving, G., Isard, M., Jia, Y., Jozefowicz, R., Kaiser, L., Kudlur, M., Levenberg, J., Mané, D., Monga, R., Moore, S., Murray, D., Olah, C., Schuster, M., Shlens, J., Steiner, B., Sutskever, I., Talwar, K., Tucker, P., Vanhoucke, V., Vasudevan, V., Viégas, F., Vinyals, O., Warden, P., Wattenberg, M., Wicke, M., Yu, Y., Zheng, X.: TensorFlow: Large-scale machine learning on heterogeneous systems (2015) Software available from tensorflow.org.

[47] Chollet, F., et al.: Keras. https://github.com/keras-team/keras (2015)X

[48] Gaiser, H., de Vries, M., Williamson, A., Henon, Y., Morariu, M., Lacatusu, V., Liscio, E., Fang, W., Clark, M., Sande, M. V., Kocabas, M.: fizyr/keras-retinanet 0.2. https://github.com/fizyr/keras-retinanet (2018)X

[49] Deng, J., Dong, W., Socher, R., Li, L. J., Li, K., Fei-Fei, L.: ImageNet: A Large-Scale Hierarchical Image Database. In: IEEE Conference on Computer Vision and Pattern Recognition. (2009)

[50] Kingma, D. P., Ba, J.: Adam: A method for stochastic optimization. In: International Conference on Learning Representations. (2015)

[51] Bengio, Y., Louradour, J., Collobert, R., Weston, J.: Curriculum learning. In: International Conference on Machine Learning. (2009)

[52] Everingham, M., Eslami, S. M. A., Van Gool, L., Williams, C. K. I., Winn, J., Zisserman, A.: The pascal visual object classes challenge: A retrospective. In: International Journal of Computer Vision. Volume 111. (2015) 98-136

[53] Ronchi, M. R., Perona, P.: Benchmarking and Error Diagnosis in Multi-Instance Pose Estimation. In: International Conference on Computer Vision. (2017)

[54] Xie, S., Girshick, R., Dollár, P., Tu, Z., He, K.: Aggregated residual transformations for deep neural networks. In: IEEE Conference on Computer Vision and Pattern Recognition. (2017)

[55] Chen, L. C., Zhu, Y., Papandreou, G., Schroff, F., Adam, H.: Encoder-Decoder with Atrous Separable Convolution for Semantic Image Segmentation. In: arXiv preprint arXiv:1802.02611. (2018)

[56] Kendall, A., Badrinarayanan, V., Cipolla, R.: Bayesian segnet: Model uncertainty in deep convolutional encoder-decoder architectures for scene understanding. In: British Machine Vision Conference. (2017)

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A system for estimating a pose of one or more persons in a scene, the system comprising:
   a camera, the camera configured to capture an image of the scene; and
   a data processor including at least one hardware component, the data processor configured to execute computer executable instructions, the computer executable instructions comprising instructions for:
   receiving the image of the scene from the camera;
   extracting features from the image of the scene for providing inputs to a keypoint subnet and a person detection subnet;
   generating a plurality of keypoints using the keypoint subnet;
   generating one or more person instances using the person detection subnet;
   assigning the plurality of keypoints to the one or more person instances by utilizing learned pose structures from image data;
   implementing a pose residual network to assign the plurality of keypoints to the one or more person instances, the plurality of keypoints comprising different keypoint types, the pose residual network determining a particular keypoint type for a person by applying a residual correction to a learned pose generated from keypoint data comprising the different keypoint types, and adding the residual correction to uncorrected keypoint data for the particular keypoint type obtained from the keypoint subnet, wherein the residual correction is a deep learning model residual and is implemented by inputting a subset of keypoints corresponding to a particular one of the person instances into a residual multilayer perceptron; and
   determining one or more poses of the one or more persons in the scene using the assignment of the plurality of keypoints to the one or more person instances.

2. The system according to claim 1, wherein the data processor is configured to extract the features from the image of the scene using one or more residual networks and one or more feature pyramid networks, which together form a backbone feature extractor for the keypoint and person detection subnets.

3. The system according to claim 2, wherein the one or more residual networks utilized by the data processor comprise a plurality of layers, and wherein the one or more feature pyramid networks utilized by the data processor are connected to each of the plurality of layers of the one or more residual networks.

4. The system according to claim 3, wherein the one or more feature pyramid networks utilized by the data processor comprise first and second feature pyramid networks, each of the first and second feature pyramid networks connected to the plurality of layers of the one or more residual networks; and
   wherein the data processor is configured to extract the features for the keypoint subnet from the first one of the feature pyramid networks, and the data processor is configured to extract the features for the person detection subnet from the second one of the feature pyramid networks.

5. The system according to claim 4, wherein the one or more residual networks utilized by the data processor comprise one or more convolutional neural networks; and
   wherein, as part of utilizing the first and second feature pyramid networks, the data processor is configured to create pyramid maps with top-down connections from each of the plurality of layers of the one or more residual neural networks feature hierarchy so as to make use of inherent multi-scale representations of a convolutional neural network feature extractor.

6. The system according to claim 4, wherein the data processor is configured to extract the features from the first and second feature pyramid networks for the respective keypoint and person detection subnets by utilizing a parallel arrangement of the first and second feature pyramid networks.

7. The system according to claim 4, wherein the data processor is configured to generate the plurality of keypoints using the keypoint subnet by receiving hierarchical convolutional neural network features outputted by the first feature pyramid network as inputs, and then generating keypoint and segmentation heatmaps as outputs.

8. The system according to claim 7, wherein the keypoint heatmaps generated by the data processor represent keypoint locations as Gaussian peaks.

9. The system according to claim 7, wherein the keypoint heatmaps generated by the data processor comprise a plurality of heatmap layers, each of the plurality of heatmap layers corresponding to a particular one of the different keypoint types.

10. The system according to claim 9, wherein the particular keypoint type of the keypoint heatmaps generated by the data processor is selected from a group consisting of an eye, a nose, a wrist, an elbow, a knee, and an ankle.

11. The system according to claim 4, wherein the data processor is configured to generate the one or more person instances using the person detection subnet by utilizing a one-stage object detector.

12. The system according to claim 4, wherein the data processor is configured to generate one or more person detection boxes as a result of executing the person detection subnet.

13. The system according to claim 2, wherein the data processor is further configured to separately train each of the keypoint subnet, the person detection subnet, and the pose residual network.

14. The system according to claim 13, wherein, during the training of the system, the data processor is configured to train the keypoint subnet prior to training the person detection subnet.

15. The system according to claim 14, wherein, during the training of the system, the data processor is configured to train the person detection subnet while backbone weights of the backbone feature extractor are kept frozen.

16. The system according to claim 1, wherein the one or more poses of the one or more persons in the scene determined by the data processor comprise one or more two-dimensional poses or one or more three-dimensional poses of the one or more persons.

17. The system according to claim 16, further comprising one or more additional cameras configured to capture one or more additional images of the scene from varying perspectives; and
   wherein the one or more poses of the one or more persons in the scene determined by the data processor comprise one or more three-dimensional poses of the one or more persons.

18. The system according to claim 1, wherein the data processor is configured to assign the one or more keypoints to the one or more person instances by additionally considering one or more further images depicting a movement of the one or more persons over a period of time.

* * * * *